United States Patent
Hosseini et al.

(10) Patent No.: US 12,096,418 B2
(45) Date of Patent: Sep. 17, 2024

(54) INTERFERENCE MEASUREMENT FOR SIDELINK COMMUNICATION

(71) Applicant: QUALCOMM Incorporated, San Diego, CA (US)

(72) Inventors: Seyedkianoush Hosseini, San Diego, CA (US); Wei Yang, San Diego, CA (US); Muhammad Sayed Khairy Abdelghaffar, San Jose, CA (US); Abdelrahman Mohamed Ahmed Mohamed Ibrahim, San Diego, CA (US); Ahmed Attia Abotabl, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 17/339,664

(22) Filed: Jun. 4, 2021

(65) Prior Publication Data

US 2022/0394732 A1 Dec. 8, 2022

(51) Int. Cl.
*H04W 72/1263* (2023.01)
*H04L 5/14* (2006.01)
(Continued)

(52) U.S. Cl.
CPC .......... *H04W 72/1263* (2013.01); *H04L 5/14* (2013.01); *H04L 27/2607* (2013.01);
(Continued)

(58) Field of Classification Search
CPC . H04W 72/1263; H04W 28/26; H04W 72/02; H04W 72/0453; H04W 72/1226; H04L 5/14; H04L 27/2607
See application file for complete search history.

(56) References Cited

U.S. PATENT DOCUMENTS

2015/0334760 A1 11/2015 Sartori et al.
2019/0089502 A1* 3/2019 Yi .................. H04W 16/14
(Continued)

FOREIGN PATENT DOCUMENTS

EP     3550905 A1    10/2019
WO  2014200212 A1   12/2014
(Continued)

OTHER PUBLICATIONS

International Search Report and Written Opinion—PCT/US2022/029045—ISA/EPO—Aug. 16, 2022.

*Primary Examiner* — Xuan Lu
(74) *Attorney, Agent, or Firm* — Loza & Loza, LLP

(57) ABSTRACT

Aspects relate to measuring interference associated with sidelink communication. A UE that supports full-duplex communication may transmit on a first frequency resource and conduct self-interference measurements on a second frequency resource (e.g., a guard band) adjacent to the first frequency resource. Provisions may be made to ensure that other nearby wireless communication devices do not transmit on the second set of frequency resources when the UE is conducting an interference measurement. In a first resource allocation mode, a base station that allocates full-duplex resources for a first UE may ensure that any UEs that are near the first UE are not scheduled to transmit on a guard band when the UE is conducting an interference measurement. In a second resource allocation mode, a UE may reserve resources that are predefined with a guard band or the UE may reserve resources and use a subset of the resources for interference measurements.

27 Claims, 18 Drawing Sheets

(51) Int. Cl.
  *H04L 27/26*      (2006.01)
  *H04W 28/26*      (2009.01)
  *H04W 72/02*      (2009.01)
  *H04W 72/0453*    (2023.01)
  *H04W 72/12*      (2023.01)
  *H04W 72/23*      (2023.01)
  *H04W 72/54*      (2023.01)
  *H04W 76/14*      (2018.01)

(52) U.S. Cl.
  CPC ........... *H04W 28/26* (2013.01); *H04W 72/02* (2013.01); *H04W 72/0453* (2013.01); *H04W 72/54* (2023.01)

(56) References Cited

U.S. PATENT DOCUMENTS

| | | | | |
|---|---|---|---|---|
| 2019/0207697 A1* | 7/2019 | Ghasemzadeh | ...... | H04B 17/336 |
| 2019/0260485 A1* | 8/2019 | Byun | ...... | H04W 4/40 |
| 2019/0306835 A1* | 10/2019 | Hoang | ...... | H04W 72/0493 |
| 2020/0313779 A1* | 10/2020 | Kim | ...... | H04B 17/24 |
| 2021/0136742 A1* | 5/2021 | Huang | ...... | H04L 5/0057 |
| 2021/0281386 A1* | 9/2021 | Xia | ...... | H04B 1/525 |
| 2022/0053353 A1* | 2/2022 | Lee | ...... | H04L 5/0048 |
| 2022/0182160 A1* | 6/2022 | Su | ...... | H04B 17/309 |
| 2022/0386146 A1* | 12/2022 | Lee | ...... | H04B 17/0085 |
| 2023/0189382 A1* | 6/2023 | Haustein | ...... | H04W 76/20 |
| | | | | 370/329 |

FOREIGN PATENT DOCUMENTS

| | | | | |
|---|---|---|---|---|
| WO | WO-2016191072 A1 * | 12/2016 | ...... | H04B 1/48 |
| WO | WO-2022160080 A1 * | 8/2022 | | |

* cited by examiner

INTERFERENCE MEASUREMENT FOR SIDELINK COMMUNICATION

TECHNICAL FIELD

The technology discussed below relates generally to wireless communication and, more particularly, to techniques for measuring interference at a wireless communication device that supports sidelink communication.

INTRODUCTION

In many existing wireless communication systems, a cellular network is implemented by enabling wireless communication devices to communicate with one another through signaling with a nearby base station or cell. As a wireless communication device moves across the service area, handovers take place such that each wireless communication device maintains communication with one another via its respective cell.

Another scheme for a wireless communication system is a device to device (D2D) network, in which wireless communication devices may signal one another directly, rather than via an intermediary base station or cell. D2D communication networks may utilize direct signaling (e.g., sidelink signaling) to facilitate direct communication between wireless communication devices over a proximity service (ProSe) PC5 interface. In some D2D configurations, wireless communication devices may further communicate in a cellular system, generally under the control of a base station. Thus, the wireless communication devices may be configured for uplink and downlink signaling via a base station and further for sidelink signaling directly between the wireless communication devices without transmissions passing through the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a first user equipment is disclosed. The method may include receiving scheduling information from a base station. The scheduling information may indicate that a first set of resources of a plurality of sidelink resources is allocated for the first user equipment for full-duplex communication. The scheduling information may further indicate that a first frequency resource of the first set of resources is to be used by the first user equipment for a self-interference measurement. The method may also include measuring interference on the first frequency resource while transmitting a signal on a second frequency resource of the first set of resources.

In some examples, a first user equipment may include a transceiver, a memory, and a processor coupled to the transceiver and the memory. The processor and the memory may be configured to receive scheduling information from a base station. The scheduling information may indicate that a first set of resources of a plurality of sidelink resources is allocated for the first user equipment for full-duplex communication. The scheduling information may further indicate that a first frequency resource of the first set of resources is to be used by the first user equipment for a self-interference measurement. The processor and the memory may also be configured to measure interference on the first frequency resource while transmitting a signal on a second frequency resource of the first set of resources via the transceiver.

In some examples, a first user equipment may include means for receiving scheduling information from a base station. The scheduling information may indicate that a first set of resources of a plurality of sidelink resources is allocated for the first user equipment for full-duplex communication. The scheduling information may further indicate that a first frequency resource of the first set of resources is to be used by the first user equipment for a self-interference measurement. The first user equipment may also include means for measuring interference on the first frequency resource while transmitting a signal on a second frequency resource of the first set of resources.

In some examples, an article of manufacture for use by a first user equipment includes a non-transitory computer-readable medium having stored therein instructions executable by one or more processors of the first user equipment to receive scheduling information from a base station. The scheduling information may indicate that a first set of resources of a plurality of sidelink resources is allocated for the first user equipment for full-duplex communication. The scheduling information may further indicate that a first frequency resource of the first set of resources is to be used by the first user equipment for a self-interference measurement. The computer-readable medium may also have stored therein instructions executable by one or more processors of the user equipment to measure interference on the first frequency resource while transmitting a signal on a second frequency resource of the first set of resources.

In some examples, a method for wireless communication at a first user equipment is disclosed. The method may include identifying a first set of resources of a plurality of sidelink resources to be used by the first user equipment for full-duplex communication, identifying a first frequency resource of the first set of resources to be used by the first user equipment for a self-interference measurement, and measuring interference on the first frequency resource while transmitting a signal on a second frequency resource of the first set of resources.

In some examples, a first user equipment may include a transceiver, a memory, and a processor coupled to the transceiver and the memory. The processor and the memory may be configured to identify a first set of resources of a plurality of sidelink resources to be used by the first user equipment for full-duplex communication, identify a first frequency resource of the first set of resources to be used by the first user equipment for a self-interference measurement, and measure interference on the first frequency resource while transmitting a signal on a second frequency resource of the first set of resources via the transceiver.

In some examples, a first user equipment may include means for identifying a first set of resources of a plurality of sidelink resources to be used by the first user equipment for full-duplex communication, means for identifying a first frequency resource of the first set of resources to be used by the first user equipment for a self-interference measurement, and means for measuring interference on the first frequency resource while transmitting a signal on a second frequency resource of the first set of resources.

In some examples, an article of manufacture for use by a first user equipment includes a non-transitory computer-readable medium having stored therein instructions executable by one or more processors of the first user equipment to identify a first set of resources of a plurality of sidelink resources to be used by the first user equipment for full-duplex communication, identify a first frequency resource of the first set of resources to be used by the first user equipment for a self-interference measurement, and measure interference on the first frequency resource while transmitting a signal on a second frequency resource of the first set of resources.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
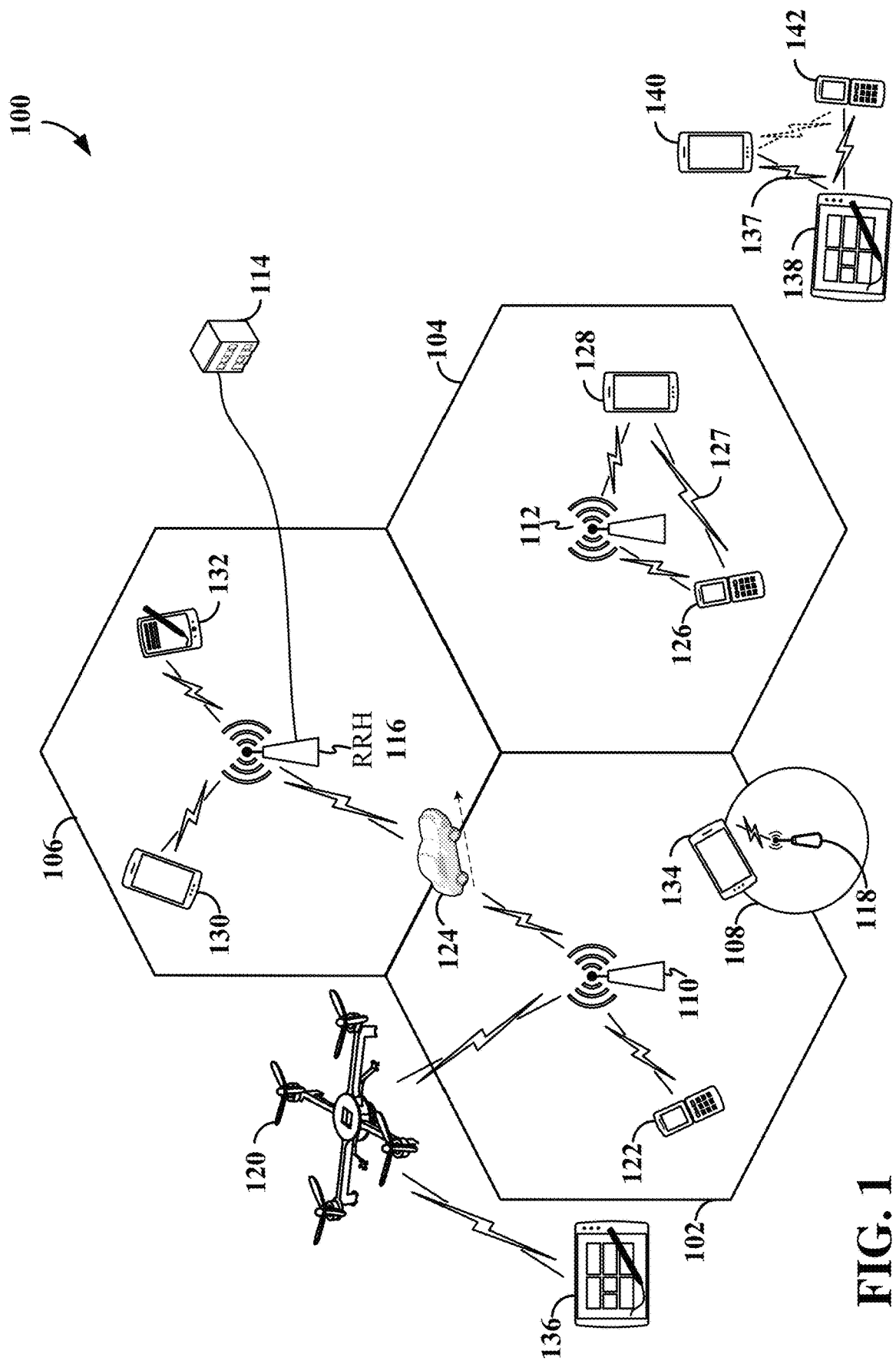
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to measuring interference associated with sidelink communication. For example, a user equipment (UE) that is capable of full-duplex communication (e.g., sub-band full-duplex (SBFD) communication) may transmit on a first set of frequency resources of a slot and conduct self-interference measurements on a second set of frequency resources (e.g., a guard band) of the slot that is adjacent to the first set of frequency resources. In some examples, provisions may be made in an attempt to ensure that other nearby wireless communication devices do not transmit on the second set of frequency resources (e.g., the guard band) when the UE is conducting an interference measurement.

In a first resource allocation mode, a base station allocates SBFD resources from a sidelink resource pool to a first UE. Here, the SBFD resources may include a guard band for the first UE to conduct an interference measurement. In this case, the base station may attempt to ensure that any UEs that are near the first UE are not scheduled to transmit during the guard band.

In a second resource allocation mode, a first UE senses resources of a sidelink resource pool to identify resources that are available to the first UE. The first UE may then reserve the available resources by sending a corresponding reservation message to nearby UEs.

In some examples, the reserved resources may include a predefined frequency gap (e.g., guard band) that the first UE can use to conduct an interference measurement. For example, the first UE may select a resource that has been preassigned (e.g., by the network) for interference measurements by UEs in the network, where the resource (e.g., a measurement occasion) is configured with measurement resources and frequency gaps between these measurement resources.

In some examples, the first UE may reserve a set of resources and then use one or more subchannels of the set of resources for an interference measurement. For example, the first UE may designate one subchannel of the reserved set of resources for interference measurements and designate the rest of the subchannels for data communication. Accordingly, when the first UE transmits on one or more of the data subchannels, the first UE may conduct an interference measurement on the interference subchannel.

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eU-TRAN) standards, often referred to as Long Term Evolution (LTE). The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station (e.g., the UAV 120). Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on Institute of Electrical and Electronics Engineers (IEEE) 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full-duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
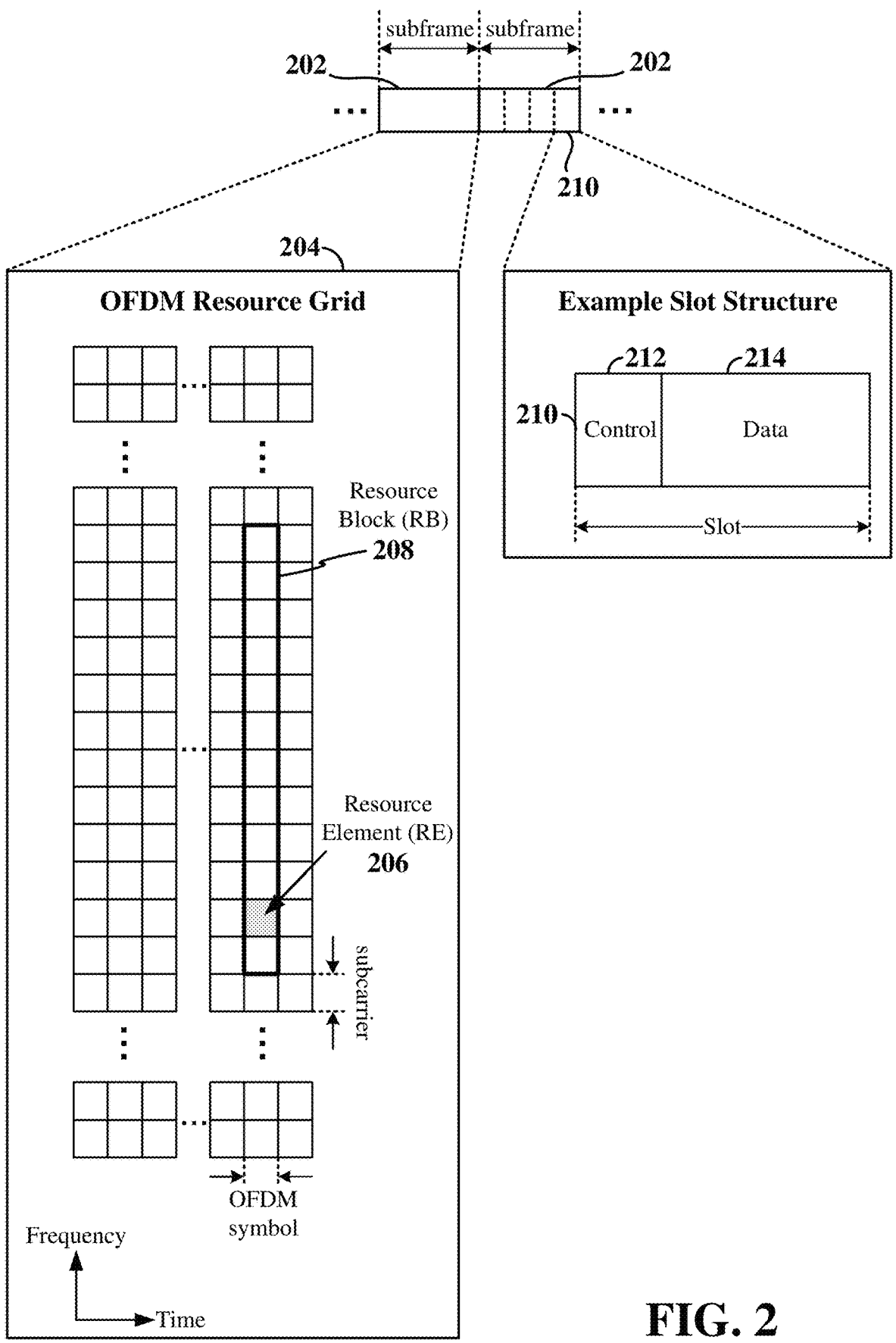
FIG. 2 is a schematic diagram illustrating organization of wireless resources in an air interface utilizing orthogonal frequency divisional multiplexing (OFDM) according to some aspects.

Referring now to FIG. 2, an expanded view of an example subframe 202 is illustrated, showing an OFDM resource grid. However, as those skilled in the art will readily appreciate, the physical layer (PHY layer) transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier x 1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely an example, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device)

to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB 1. Examples of remaining minimum system information (RMSI) transmitted in the SIB 1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
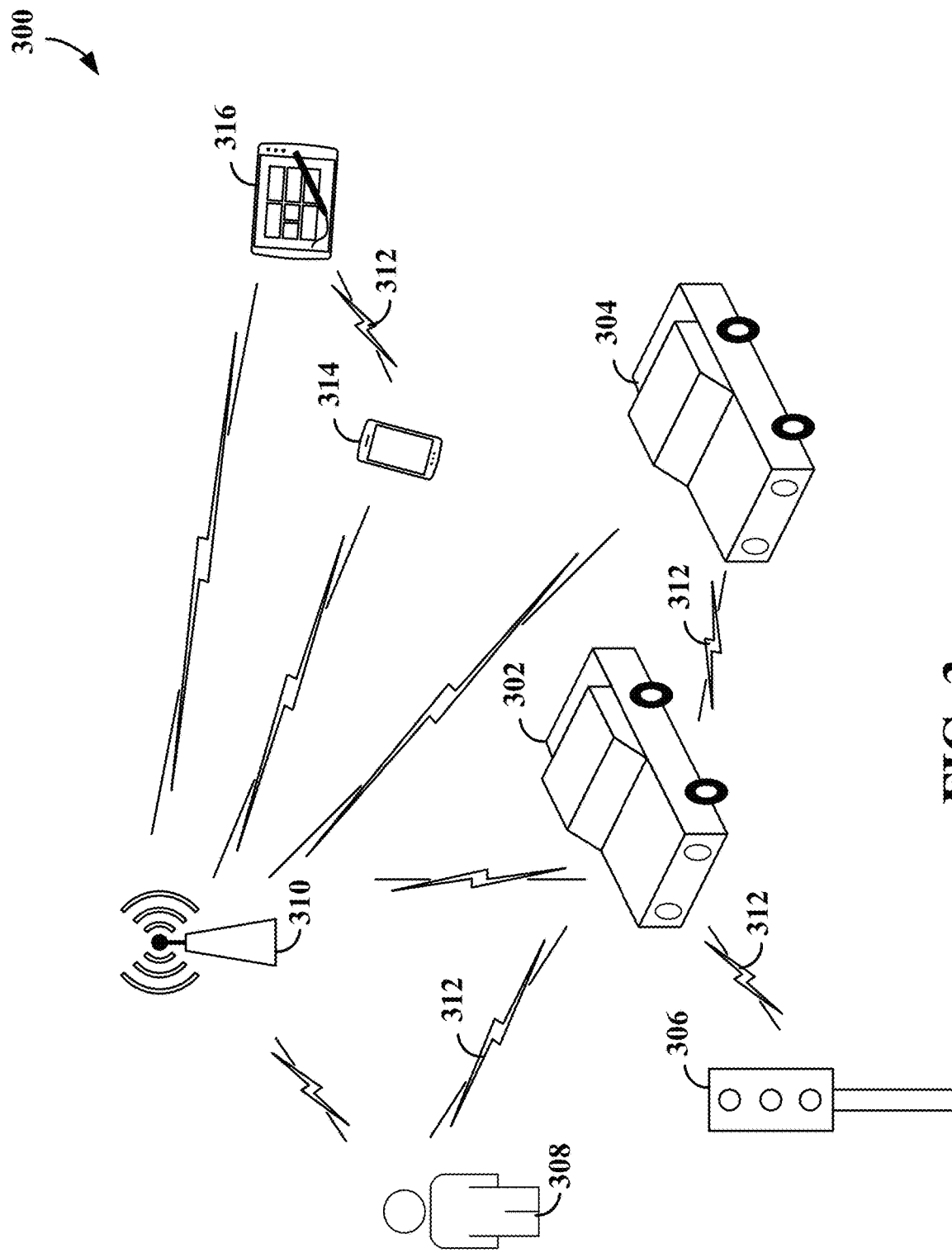
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

V2X transmissions may include, for example, unicast transmissions, groupcast transmissions, and broadcast transmissions. A unicast transmission may include, for example, a transmission from a vehicle (e.g., vehicle 302) to one other vehicle (e.g., vehicle 304). A groupcast transmission may include, for example, a transmission when group of UEs (e.g., vehicles 302 and 304) form a cluster. In this case, data may be groupcasted within the cluster. A broadcast transmission may include, for example, a transmission from a UE (e.g., vehicle 302) to surrounding receivers (e.g., vehicle 304, a roadside unit (RSU) 306, mobile devices 308 of pedestrians/cyclists, the network (e.g., base station 310), or any combination thereof) in proximity to the transmitting UE.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include public safety or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. The base station 310 may further activate preconfigured sidelink grants (e.g., configured grants) for sidelink communication among the sidelink devices. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figure 4:
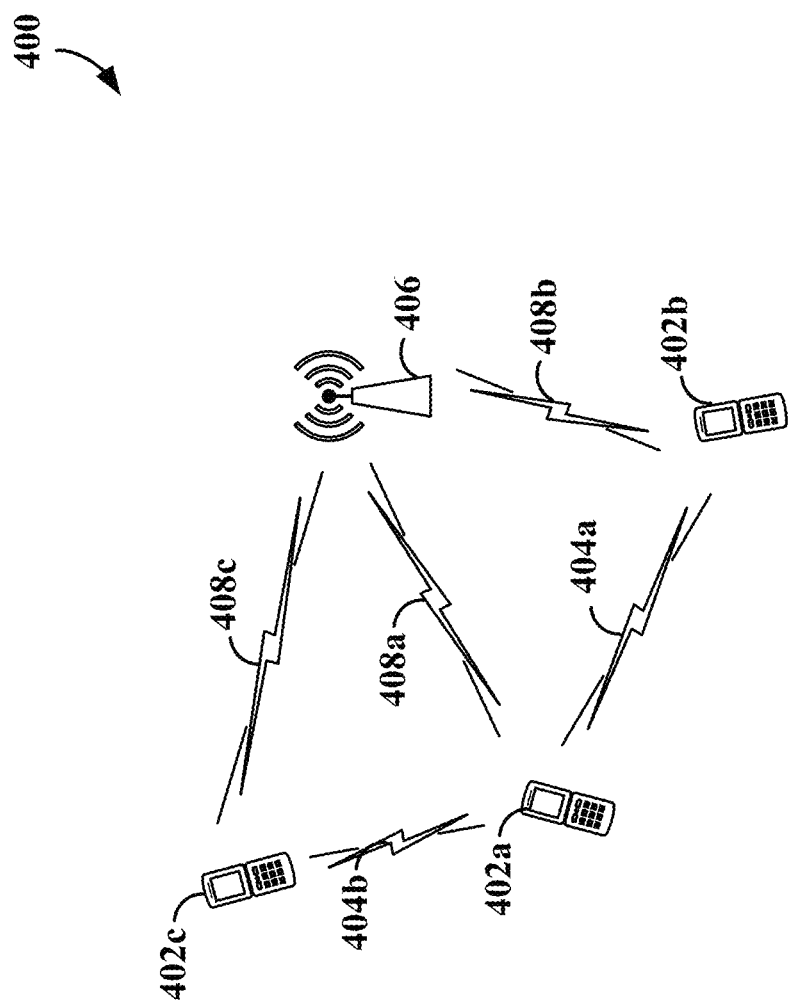
FIG. 4 is a diagram illustrating an example of a wireless communication network for facilitating both cellular and sidelink communication according to some aspects.

FIG. 4 is a diagram illustrating an example of a wireless communication network 400 for facilitating both cellular and sidelink communication. The wireless communication network 400 may correspond, for example, to the RAN 100 illustrated in FIG. 1. The wireless communication network 400 includes a plurality of wireless communication devices 402a, 402b, and 402c and a base station (e.g., eNB or gNB) 406. In some examples, the wireless communication devices 402a, 402b, and 402c may be UEs capable of implementing sidelink communication (e.g., V2X or D2D). The wireless communication devices 402a, 402b, and 402c may correspond to any of the UEs or scheduled entities shown in any of FIGS. 1, 2, 7, 12, and 15. The base station 406 may correspond to any of the base stations or scheduling entities shown in any of FIGS. 1, 2, and 7.

The wireless communication devices 402a and 402b may communicate over a first sidelink 404a, while wireless communication devices 402a and 402c may communicate over a second sidelink 404b. Each of the sidelinks 404a and 404b may utilize, for example, a PC5 interface. Wireless communication devices 402a, 402b, and 402c may further communicate with the base station 406 over respective Uu links 408a, 408b, and 408b. The sidelink communication over the sidelinks 404a and 404b may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the sidelinks 404a and 404b and Uu links 408a-408c, such that resources on the common carrier may be allocated for both sidelink communication between wireless communication devices 402a-402c and cellular communication (e.g., uplink and downlink communication) between the wireless communication devices 402a-402c and the base station 406. For example, the wireless communication network 400 may be configured to support a Mode 1 sidelink network in which resources for both sidelink and cellular communication are scheduled by the base station 406. In other examples in which Mode 2 sidelink is implemented on the sidelinks 404a and 404b, the wireless communication devices 402a-402c may autonomously select sidelink resources (e.g., from one or more frequency bands or sub-bands designated for sidelink communication) for communication therebetween. In this example, the wireless communication devices 402a-402c may function as both scheduling entities and scheduled entities scheduling sidelink resources for communication with each other.

Figure 5A:
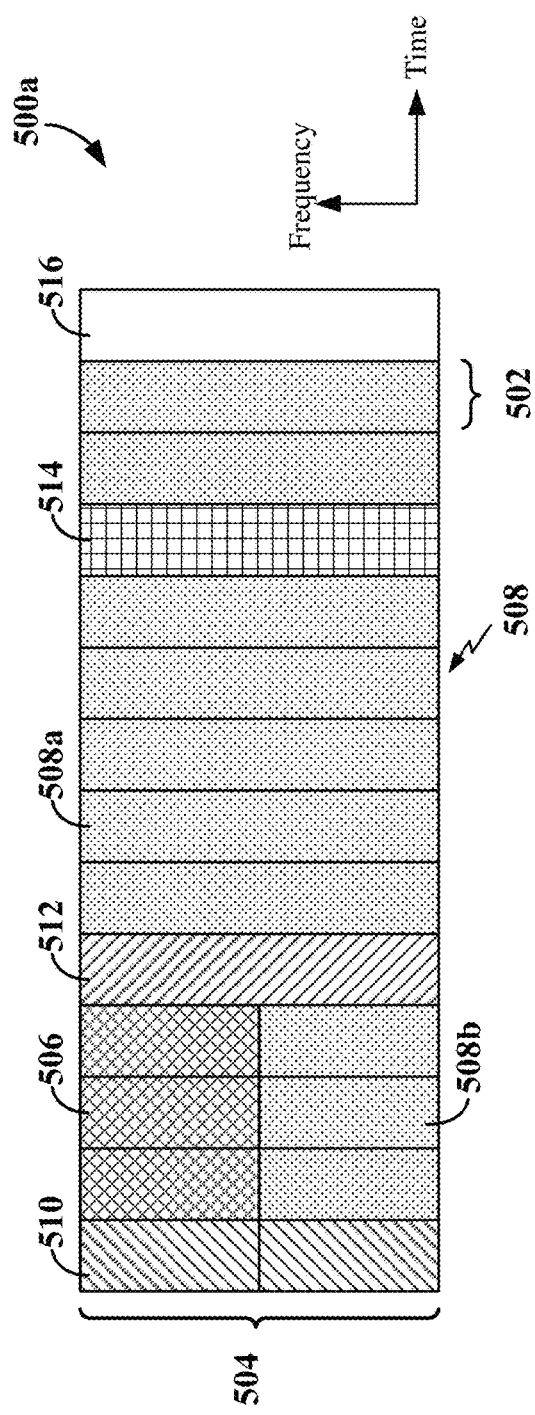
FIG. 5A is a conceptual diagram illustrating an example of a sidelink slot structure according to some aspects.
Figure 5B:
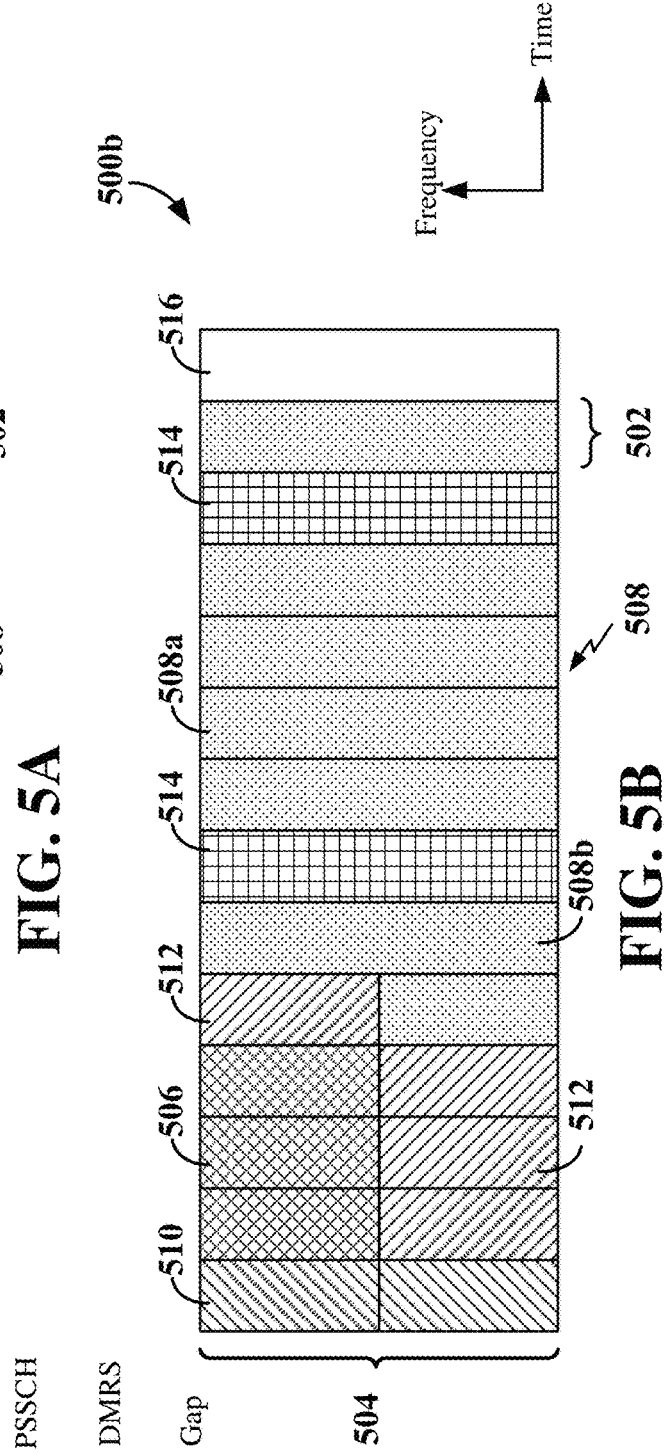
FIG. 5B is a conceptual diagram illustrating another example of a sidelink slot structure according to some aspects.

FIGS. 5A and 5B are diagrams illustrating examples of sidelink slot structures according to some aspects. The sidelink slot structures may be utilized, for example, in a V2X or other D2D network implementing sidelink. In the examples shown in FIGS. 5A and 5B, time is in the horizontal direction with units of symbols 502 (e.g., OFDM symbols); and frequency is in the vertical direction. Here, a carrier bandwidth 504 allocated for sidelink wireless communication is illustrated along the frequency axis. The carrier bandwidth 504 may include a plurality of sub-channels, where each sub-channel may include a configurable number of PRBs (e.g., 10, 14, 20, 24, 40, 44, or 100 PRBs).

Each of FIGS. 5A and 5B illustrate an example of a respective slot 500a or 500b including fourteen symbols 502 that may be used for sidelink communication. However, it should be understood that sidelink communication can be configured to occupy fewer than fourteen symbols in a slot 500a or 500b, and the disclosure is not limited to any particular number of symbols 502. Each sidelink slot 500a and 500b includes a physical sidelink control channel (PSCCH) 506 occupying a control region of the slot 500a and 500b. Each sidelink slot 500a and 500b includes a physical sidelink shared channel (PSSCH) 508 occupying a data region of the slot 500a and 500b. The PSCCH 506 and the PSSCH 508 are each transmitted on one or more symbols 502 of the slot 500a. The PSCCH 506 includes, for example, SCI-1 that schedules transmission of data traffic on time-frequency resources of the corresponding PSSCH 508. As shown in FIGS. 5A and 5B, the PSCCH 506 and corresponding PSSCH 508 are transmitted in the same slot 500a and 500b. In other examples, the PSCCH 506 may schedule a PSSCH (not shown) in a subsequent slot.

In some examples, the PSCCH 506 duration is configured to be two or three symbols. In addition, the PSCCH 506 may be configured to span a configurable number of PRBs, limited to a single sub-channel. For example, the PSCCH 506 may span 10, 12, 14, 20, or 24 PRBs of a single sub-channel. A DMRS may further be present in every PSCCH symbol. In some examples, the DMRS may be placed on every fourth RE of the PSCCH 506. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 5A and 5B, the starting symbol for the PSCCH 506 is the second symbol of the corresponding slot 500a or 500b and the PSCCH 506 spans three symbols.

The PSSCH 508 may be time-division multiplexed (TDMed) with the PSCCH 506 and/or frequency-division multiplexed (FDMed) with the PSCCH 506. In the example shown in FIG. 5A, a first portion 508a of the PSSCH 508 is TDMed with the PSCCH 506 and a second portion 508b of the PSSCH 508 is FDMed with the PSCCH 506. In the example shown in FIG. 5B, the PSSCH 508 is TDMed with the PSCCH 506.

One and two layer transmissions of the PSSCH 508 may be supported with various modulation orders. For example, the PSSCH 508 may be modulated using quadrature phase-shift keying (QPSK), or quadrature amplitude modulation (QAM) such as 16-QAM, 64-QAM and 246-QAM.

The PSSCH 508 may include DMRSs 514 configured in a two, three, or four symbol DMRS pattern. In some examples, the slot 500*a* shown in FIG. 5A includes a two symbol DMRS pattern. In some examples, the slot 500*b* shown in FIG. 5B includes a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500*a* or 500*b*. In addition, a gap symbol 516 is present after the PSSCH 508 in each slot 500*a* and 500*b*.

Each slot 500*a* and 500*b* further includes SCI-2 512 mapped to contiguous RBs in the PSSCH 508 starting from the first symbol containing a PSSCH DMRS. In the example shown in FIG. 5A, the first symbol containing a PSSCH DMRS is the fifth symbol occurring immediately after the last symbol carrying the PSCCH 506. Therefore, the SCI-2 (PSSCH DMRS) 512 is mapped to RBs within the fifth symbol. In the example shown in FIG. 5B, the first symbol containing a PSSCH DMRS is the second symbol, which also includes the PSCCH 506. In addition, the SCI-2 (PSSCH DMRS) 512 are shown spanning symbols two through five. Thus, in this example, the SCI-2 (PSSCH DMRS) 512 is FDMed with the PSCCH 506 in symbols two through four and TDMed with the PSCCH 506 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 506 may be blind decoded at the receiving wireless communication device. However, since the format, starting location, and number of REs of the SCI-2 may be derived from the SCI-1, blind decoding of SCI-2 is not needed at the receiver (receiving UE).

In each of FIGS. 5A and 5B, the second symbol of each slot 500*a* and 500*b* is copied onto (repeated on) a first symbol 510 thereof for automatic gain control (AGC) settling. For example, in FIG. 5A, the second symbol containing the PSCCH 506 FDMed with the second portion 508*b* of the PSSCH 508 may be transmitted on both the first symbol and the second symbol. In the example shown in FIG. 5B, the second symbol containing the PSCCH 506 FDMed with the SCI-2 (PSSCH DMRS) 512 may be transmitted on both the first symbol and the second symbol.

Full-duplex (FD) communication may be used to essentially double the amount of bandwidth available to a wireless communication device (e.g., a gNB or a UE) by allowing the device to transmit and receive on the same set of resources. Full-duplex communication may be characterized as in-band (e.g., where the same frequency resources are used for transmission and reception during a slot) or sub-band (e.g., where different frequency resources within a band are used for transmission and reception during a slot). Due to various complications (e.g., self-interference between downlink and uplink transmissions, gNB-to-gNB interference, and UE-to-UE interference) and additional implementation complexity associated with in-band full-duplex (IBFD), sub-band full-duplex (SBFD) may instead be used to obtain some of the benefits of FD communication, while circumventing some of the above complications associated with IBFD communication.

Figure 6:
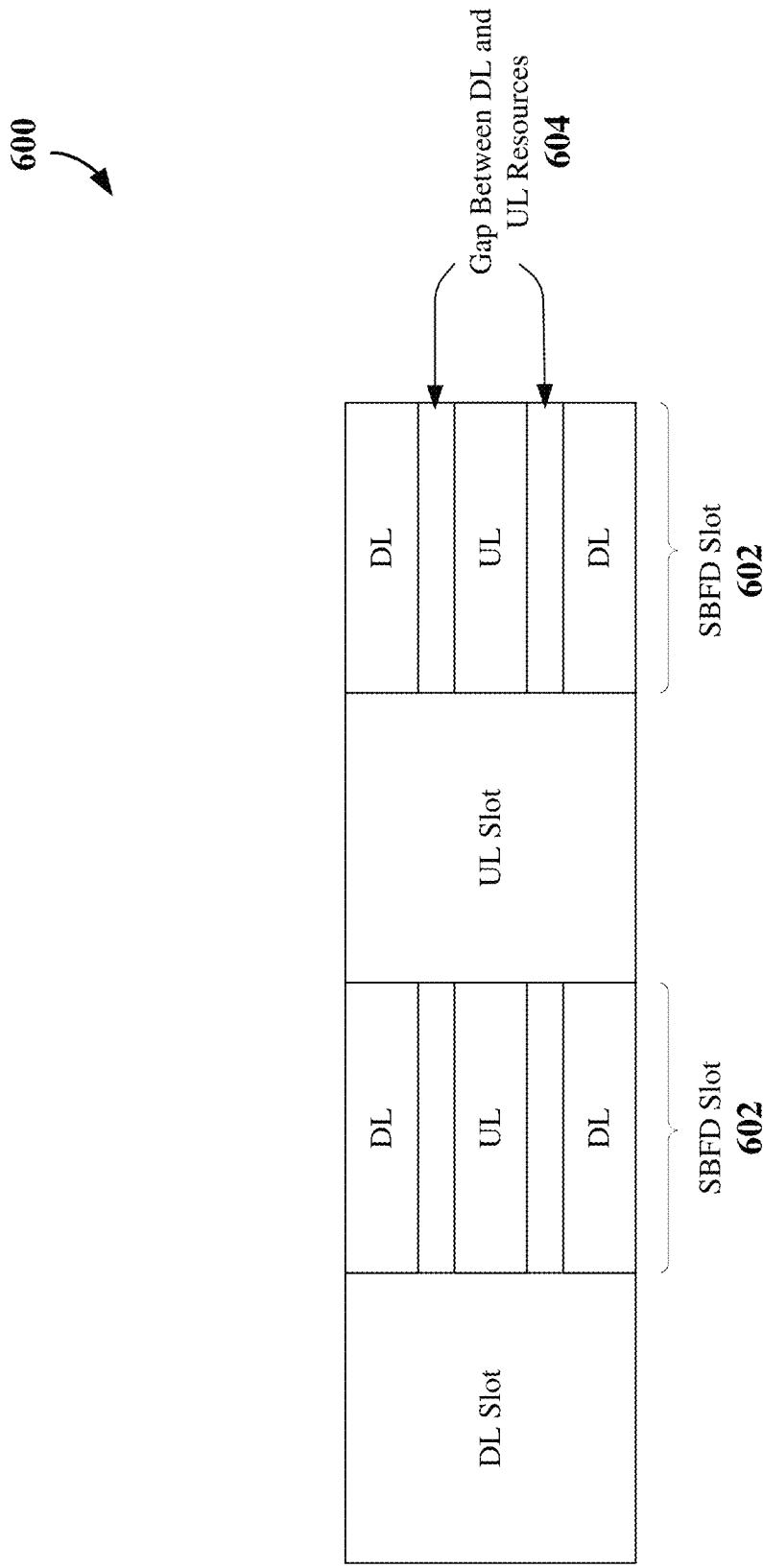
FIG. 6 is a conceptual diagram illustrating an example of a sub-band full-duplex allocation according to some aspects.

For example, as shown in the resource allocation of 600 of FIG. 6, SBFD slots 602 may be defined where resources (e.g., sub-bands) are allocated for downlink and resources (e.g., sub-bands) are allocated for uplink in each SBFD slot 602. In addition, gaps 604 may be defined between downlink resources and uplink resources. For example, in SBFD, gaps may be defined between a downlink sub-band and an uplink sub-band to reduce self-interference while still providing an improvement in latency and uplink coverage as compared to other types of communication. SBFD slots can be signaled via a common RRC configuration (e.g., by a SIB), SBFD slots could be UE specific, or SBFD slots could be indicated dynamically.

Currently, sidelink (SL) operation is allowed on uplink semi-static symbols. A UE can be configured (e.g., pre-configured) with a set of resource pools, where each resource pool is defined as a set of time-frequency resources. The minimum transmission/reception unit (i.e., allocation) in time may be a subchannel, where each subchannel is defined as a number of contiguous RBs. Each resource pool can further be configured (e.g., pre-configured) with one of two resource allocation (RA) modes.

As discussed above, in Mode 1 RA, a gNB assigns resources for a sidelink transmission. Both dynamic allocation via DCI format 3-x (e.g., DCI format 3-0 or 3-1) and configured transmissions (both Type-1 and Type-2) are supported. For example, a gNB may assign sidelink resources using an RRC configuration. As another example, a gNB may assign sidelink resources using an RRC configuration along with activation/deactivation (e.g., via a DCI).

Also as discussed above, in Mode 2 RA, a UE senses sidelink resources (e.g., by measuring reference signal received power (RSRP)) to identify resource that are available for use. Based on the outcome of the sensing (e.g., based on the priority of different transmissions and based on the measured RSRP), a UE selects one or more sidelink resources for its transmission.

In some examples, FD operation may be used in sidelink to enhance the performance of the sidelink communication. For example, using SBFD, a UE can transmit and receive in the same slot, where these transmit and receive operations take place over different frequency resources. As a result, collisions that may otherwise occur if the UE operated in FD mode using the same frequency resources for transmitting and receiving can be mitigated.

Figure 7:
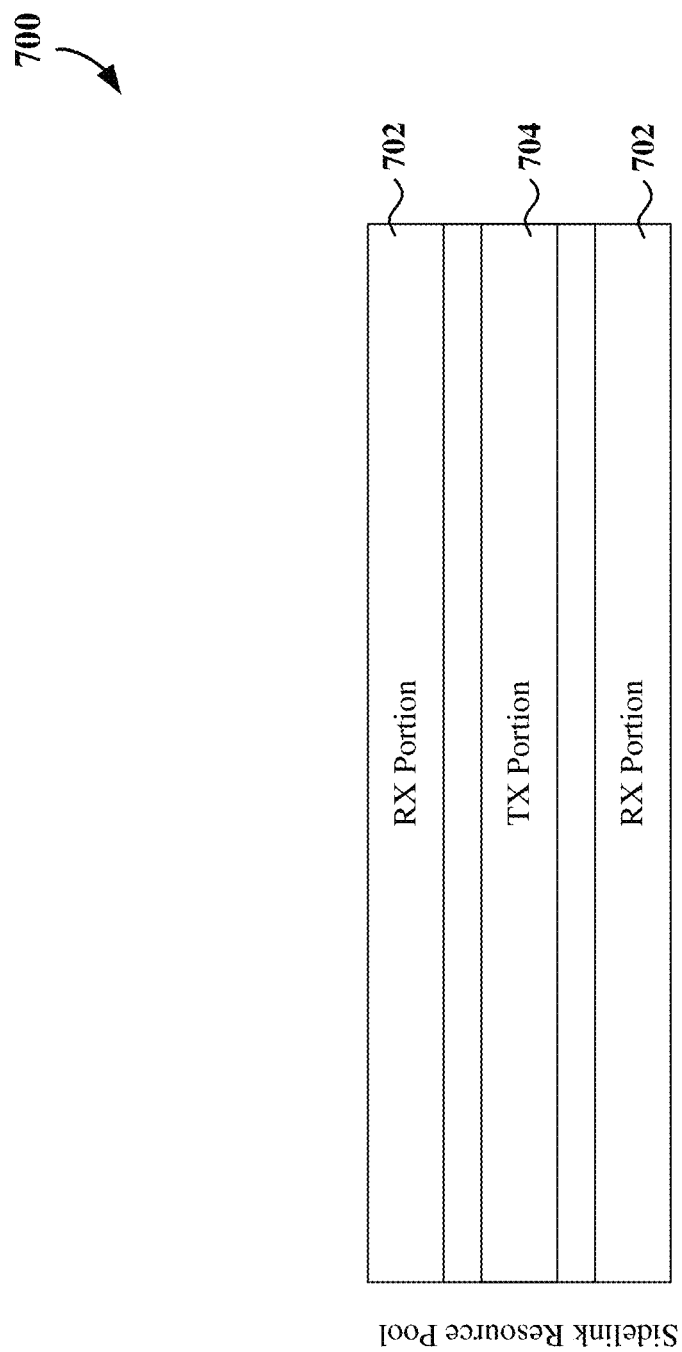
FIG. 7 is a conceptual diagram illustrating an example of a sidelink resource pool according to some aspects.

One difference between SBFD over a sidelink interface and SBFD over a Uu interface is that in sidelink, separating sub-bands by hard splitting for reception and transmission, as shown in the resource allocation 700 of FIG. 7, is not possible. For example, if UEs are restricted to only receive during the receive portions 702 and only transmit during the transmit portions 704, a UE will be unable to gather information for the same sub-band in which it is going to transmit.

However, a UE may be configured transmit over any subchannel(s) in a given slot. In addition, the number of subchannels and their locations within a resource pool may change from one slot to another. Thus, a UE may be configured to support SBFD operation whereby the UE can receive on subchannels that are not used for transmission, except for the subchannels that overlap with gaps that are needed to reduce self-interference, clutter echo (e.g., a form of self-interference), and UE-to-UE interference.

The disclosure relates in some aspects to a UE operating in SBFD mode that measures its self-interference. Self-interference may take the form of interference at a receive chain of the UE due to a transmission by a transmit chain of the UE (e.g., characterized by an adjacent channel leakage ratio (ACLR)). Self-interference could also take the form of clutter echo/reflection that is captured by the receive chain due to a transmission by the UE that is reflected back to the UE from nearby objects.

In some examples, an interference measurement may be used as an input to non-linear interference cancellation module or to determine the gap needed between the UE's transmit resources and receive resources. While ACLR or similar measurements can be done offline (e.g., before a UE is deployed in a network), online measurements (e.g., conducted when a UE is deployed in a network) may help improve the interference measurement quality by capturing the impacts of clutter echo.

Figure 8:
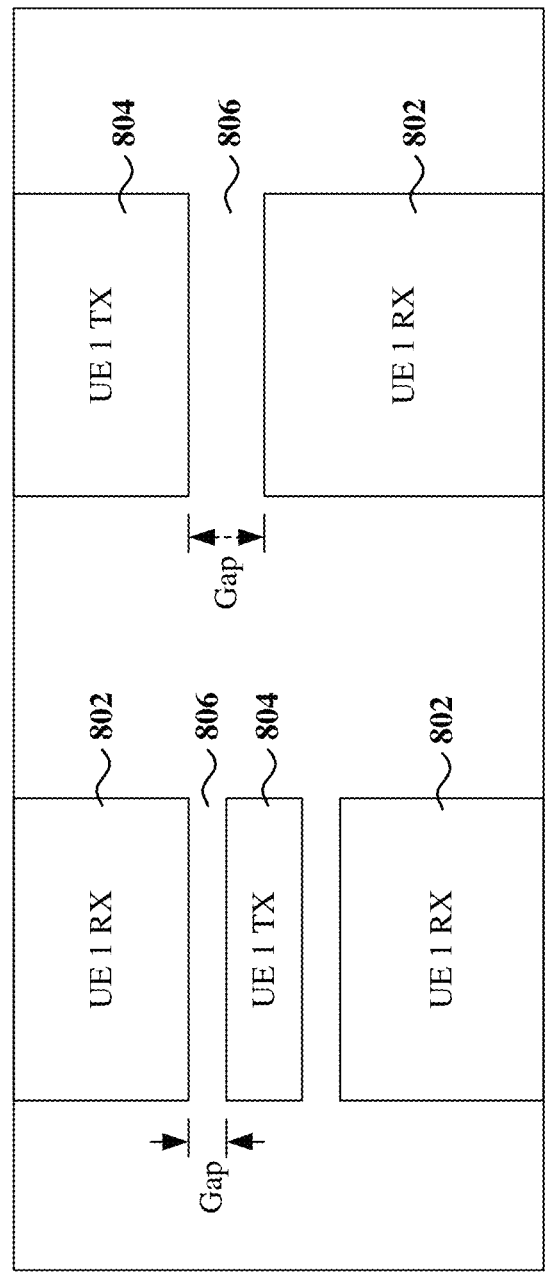
FIG. 8 is a conceptual diagram illustrating an example of sub-band full-duplex allocations in a sidelink resource pool according to some aspects.

To perform an interference measurement, a UE could transmit over a set of resources in slot n, and perform measurements in the guard band. For example, as shown in the resource allocation 800 of FIG. 8, an SBFD sidelink resource may be defined where resources 802 are allocated for UE receive operations and resources 804 are allocated for UE transmit operations. In addition, a gap 806 (e.g., a guard band) is defined between a transmit (Tx) resource and a receive (Rx) resource that are adjacent one another.

The use of a gap such as the gap 806 for mitigating interference is from the point of view of one UE, e.g., a UE X. Thus, the UE X itself does not transmit or receive in those gaps.

However, other UEs could transmit in those gaps. Such transmissions by other UEs could negatively impact the interference measurement performed by UE X.

The disclosure relates in some aspect to techniques for ensuring that other devices (e.g., UEs) do not use the gaps used by a UE for interference measurements. In some examples, these techniques may be based on whether a resource pool is configured with a resource allocation in Mode 1 or Mode 2.

The disclosure relates in some aspects to a UE conducting interference measurements when operating under Mode 1 RA. Under Mode 1, if UE X is to perform interference measurements, a gNB can ensure that other UEs are not scheduled for sidelink transmissions in the guard band of UE X.

A gNB could base its scheduling decision on how far or close the UEs are to each other (e.g., based on the geographical location/zone areas of the UEs relative to UE X). If UE X and another UE are relatively close to one another (e.g., within a threshold distance or in the same area), the gNB may abstain from scheduling a transmission by the other UE in the guard band used by UE X. On the other hand, if UE X and another UE are relatively far apart, the gNB can schedule a transmission by the other UE in the guard band of UE X, thereby enhancing resource efficiency without unduly interfering with UE X.

As another example, if cross-link interference (CLI) measurements for sidelink are enabled, UE X may be able provide the identifiers (IDs) of any interfering UEs to the gNB. In this case, the gNB can identify interfering UEs and/or non-interfering UEs and assign resources accordingly. For example, the gNB may group non-interfering UEs and allow them to transmit during UE X's guard band since the transmissions by these UEs will not adversely affect the interference measurements by UE X.

In some examples, the interference measured by a UE could be signaled to a gNB. For example, the gNB may use this information to adapt how it schedules resources for the UE in the future (e.g., to determine how large of a guard band to allocate for the UE to ensure that self-interference is kept below a target level).

In some examples, a UE may determine on its own how large the guard band should be (e.g., based on the UE's self-interference measurements). For example, the UE may measure interference on different RBs (or sub-channels, etc.) adjacent to the resources used for a transmission to determine how wide the guard band needs to be to ensure that the interference received on a non-guard band RB (or sub-channel, etc.) is below a desired threshold level. The UE may signal to the gNB an indication of a desired guard band size. The granularity of this size could be specified in terms of a number of subchannels or RBs, or a group of RBs in some examples. In some examples, the UE could report to the gNB a guard band size for different transmit power thresholds (e.g., size A for transmit power X, size B for transmit power Y, etc.). In some examples, the UE could report to the gNB a guard band size for different transmit bandwidth thresholds (e.g., size A for Tx bandwidth X, size B for Tx bandwidth Y, etc.). Such a report may be carried over PUCCH or PUSCH or sent as a MAC-CE in some examples.

The disclosure relates in some aspects to techniques for triggering interference measurements for a UE operating under Mode 1. In some examples, when a gNB gives a grant to a UE for a sidelink transmission, the gNB may indicate to the UE whether interference measurements are needed. The grant could specify the number of resources for the guard band. The grant could indicate the resources (PUCCH or PUSCH) to be used for reporting the interference measurement. Additionally, the grant could specify one or more aspects of the report such as, for example, an interference level (or a function thereof) to be reported and/or the transmit power level to be used for the report. In some examples, the grant may be a group-common grant (e.g., that is targeted for UEs in different zones).

In some examples, a gNB may semi-statically configure resources (e.g., similar to semi-persistent (SPS) resources or periodic resources) for sidelink interference measurements by a UE. These SPS-like resources are configured with an offset (e.g., an offset from a particular message) and a periodicity (e.g., the periodicity between measurements). In addition, if needed, corresponding resources may be configured for the measurement reports (e.g., as discussed above).

In some examples, a UE may trigger its interference measurement. For example, a UE may determine that its transmit operations may be interfering with its receive operations (e.g., received signal quality or some other received signal measure is poor when the UE is transmitting, but is better when the UE is not transmitting). If a UE does not currently have sidelink resources scheduled for a transmission and/or interference measurement, the UE can indicate a need for these resources. For example, the UE may send a scheduling request (SR) to a gNB. In some examples, interference measurement-specific SR configurations may be defined for this purpose. Upon receiving a resource allocation (e.g., a grant) in response to the SR, the UE may conduct interference measurements during the allocated guard band.

In some examples, interference measurement and data availability can be untied. In other words, a UE could be enabled to perform interference measurements even when the UE does not have data to transmit. For example, in a given SPS occasion assigned for an interference measurement, even if a UE does not have data for transmission, a zero protocol data unit (PDU) can be generated by the MAC layer and a corresponding PSSCH transmission can be sent. In such cases, other UEs may be informed that the PSSCH is only sent for interference measurement purposes. In some examples, an indication in SCI-1 or SCI 2 may be used for this purpose. If the indication is set to, for example, "no data," then other UEs could avoid decoding the PSSCH.

In some examples, a reference signal (RS) could be used for interference measurements. This approach may provide better multiplexing of measurement occasions for different UEs (e.g., some slots are assigned for interference measurement and each UE sends an RS only over its allocated subset of the symbols in a slot).

The disclosure relates in some aspects to a UE conducting interference measurements when operating under Mode 2 RA. As discussed above, under Mode 2, a first UE may transmit on a sidelink resource after performing resource sensing and reservation operations. The disclosure relates in some aspects to ensuring that other UEs do not use a guard band that the first UE intends to use for interference measurements under Mode 2.

Figure 9:
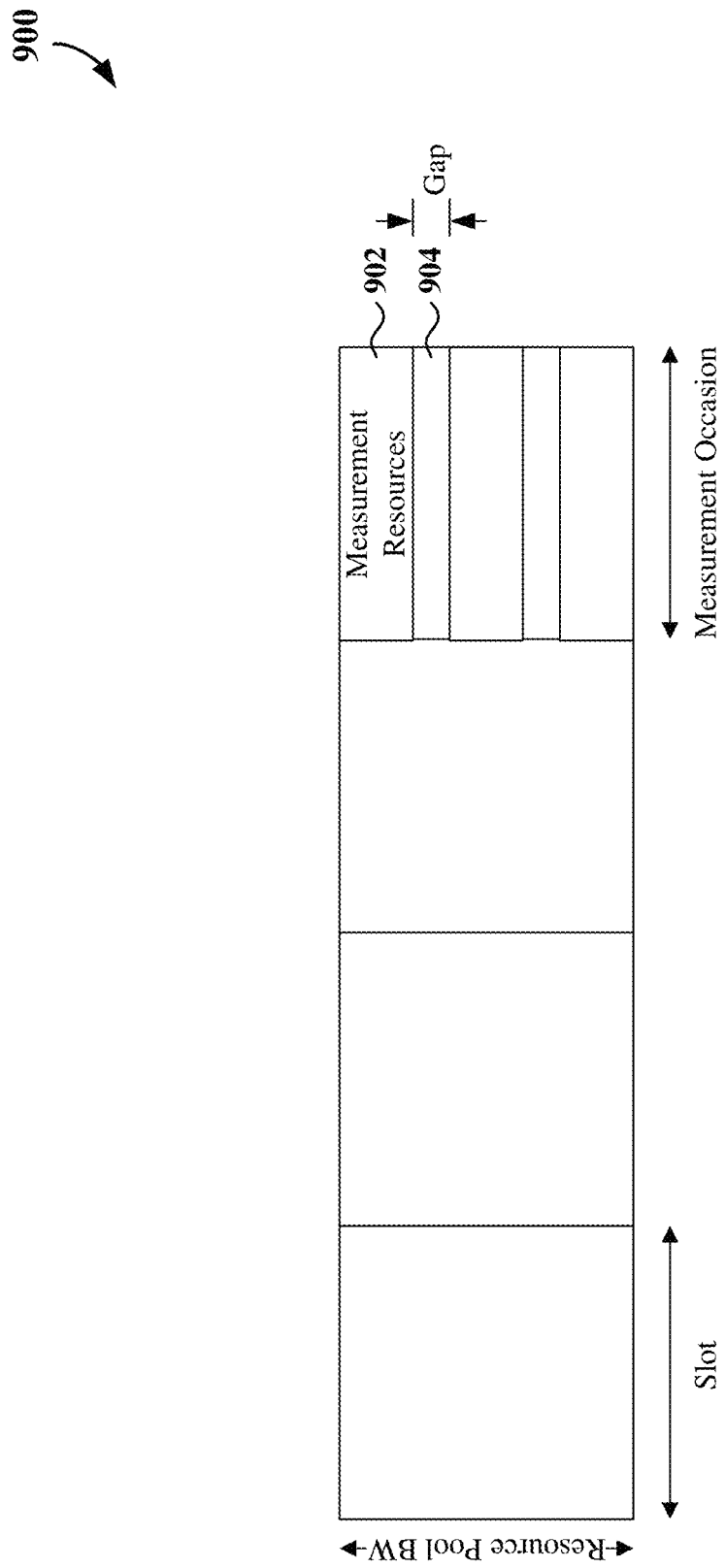
FIG. 9 is a conceptual diagram illustrating an example of a measurement occasion according to some aspects.

In some examples, resources may be set aside for measurements with predefined gaps. For example, a network may allocate dedicated resources to be used by full-duplex UEs to measure self-interference (via sensing and reservation). Each UE could then reserve at least a portion of these dedicated measurement resources when needed. For example, the resource allocation 900 of FIG. 9 illustrates a preconfigured measurement occasion in a sidelink resource pool that includes a set of measurement resources 902 with a gap 904 between different sets of resources.

Figure 10:
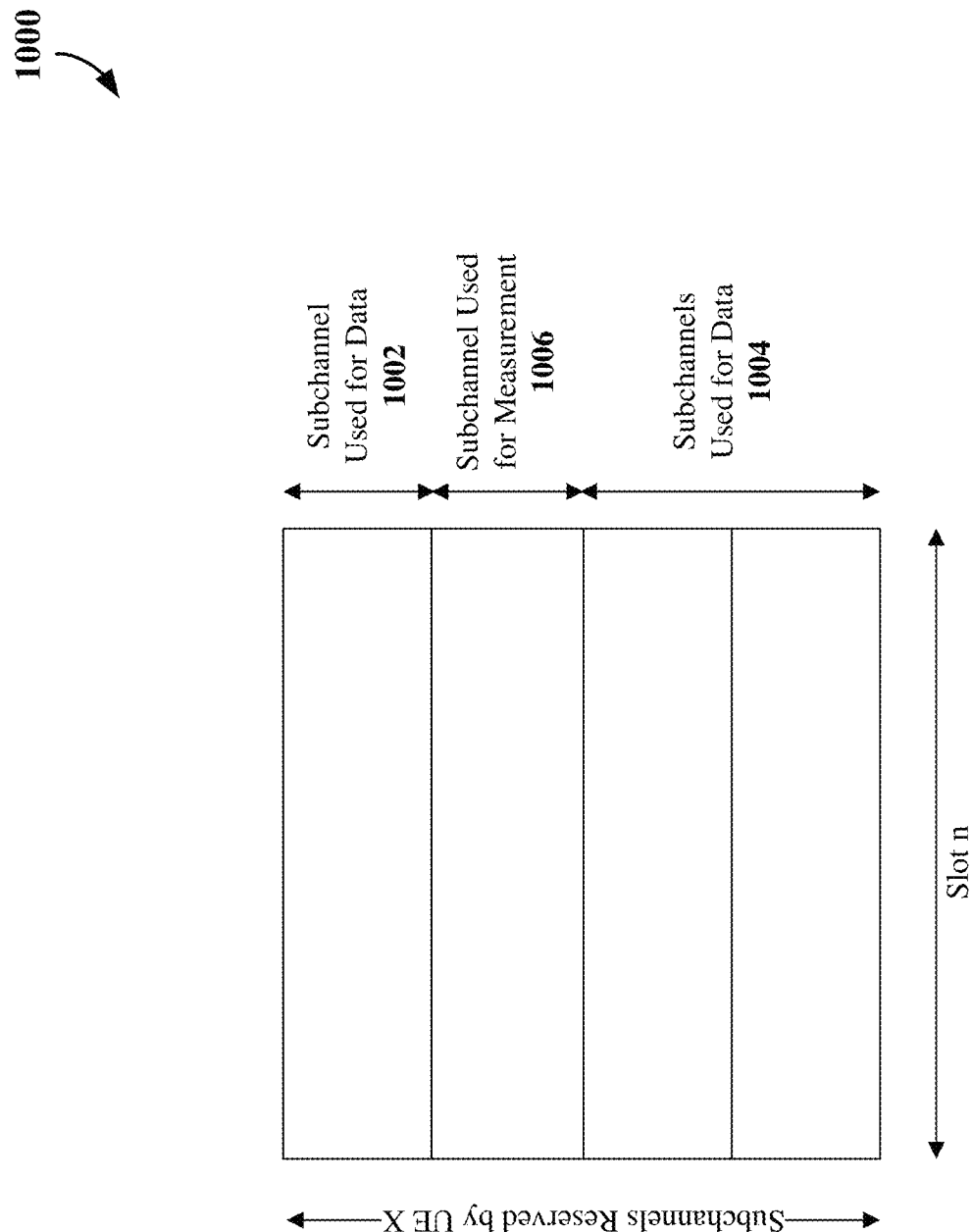
FIG. 10 is a conceptual diagram illustrating an example of reserved subchannels that may be used for an interference measurement according to some aspects.

In some examples, one or more subchannels that a UE has reserved for its transmission may instead be used as a gap. In this case, the UE does not map data to this portion of its reserved resource, thereby creating a guard band for its own measurement. As an example, in slot n, a UE reserves 4 subchannels for its PSSCH transmission. However, the UE only uses three of these subchannels for data mapping and uses the other subchannel for an interference measurement. The resource allocation 1000 of FIG. 10 illustrates a set of subchannels reserved by a UE where the subchannels 1002 and 1004 are used for data transmission or reception and a subchannel 1006 is used for interference measurements.

Data transmission and measurements may be independent under Mode 2 RA. In other words, a UE can reserve resources, even if it does not have data to transmit (e.g., as discussed above for Mode 1). Conventionally, if a UE has data to transmit, the UE's upper layer triggers the PHY layer to perform resource selection. In accordance with the teachings herein, a need for an interference measurement by a UE could also be defined as a triggering event for resource selection.

In some examples, a transmitting UE may send an indication to a receiving UE to inform the receiving UE how rate-matching may be done. For example, the receiving UE may need to determine which subchannels (or RBs) are used for mapping data and which subchannels are used by the transmitting UE for interference measurements. Thus, the transmitting UE may send such an indication to a receiving UE, either dynamically or in a semi-static manner.

An indication in SCI-1 can be used to indicate which subchannels are used as a guard band. Since indicating the index of the subchannels may use a large number of bits, one of the following approaches could alternatively be used. In some examples, the SCI-1 indicates the number of subchannels used for the guard band and their location, e.g., the starting subchannels or ending subchannels within a PSSCH (measurement pattern.). In some examples, the location of the subchannels might be fixed. In this case, the SCI-1 might only indicate the number of sub-channels. In some examples, the location and the number of subchannels may be fixed (e.g., at a known location within an allocation). In this case, the SCI-1 might simply use a flag to indicate whether resources are to be used for an interference measurement or not. In the latter two examples, the fixed parameters might be hard-coded (e.g., for broadcast and connection-less groupcast) or selected/updated by the UEs (for unicast and managed groupcast.)

Figure 11:
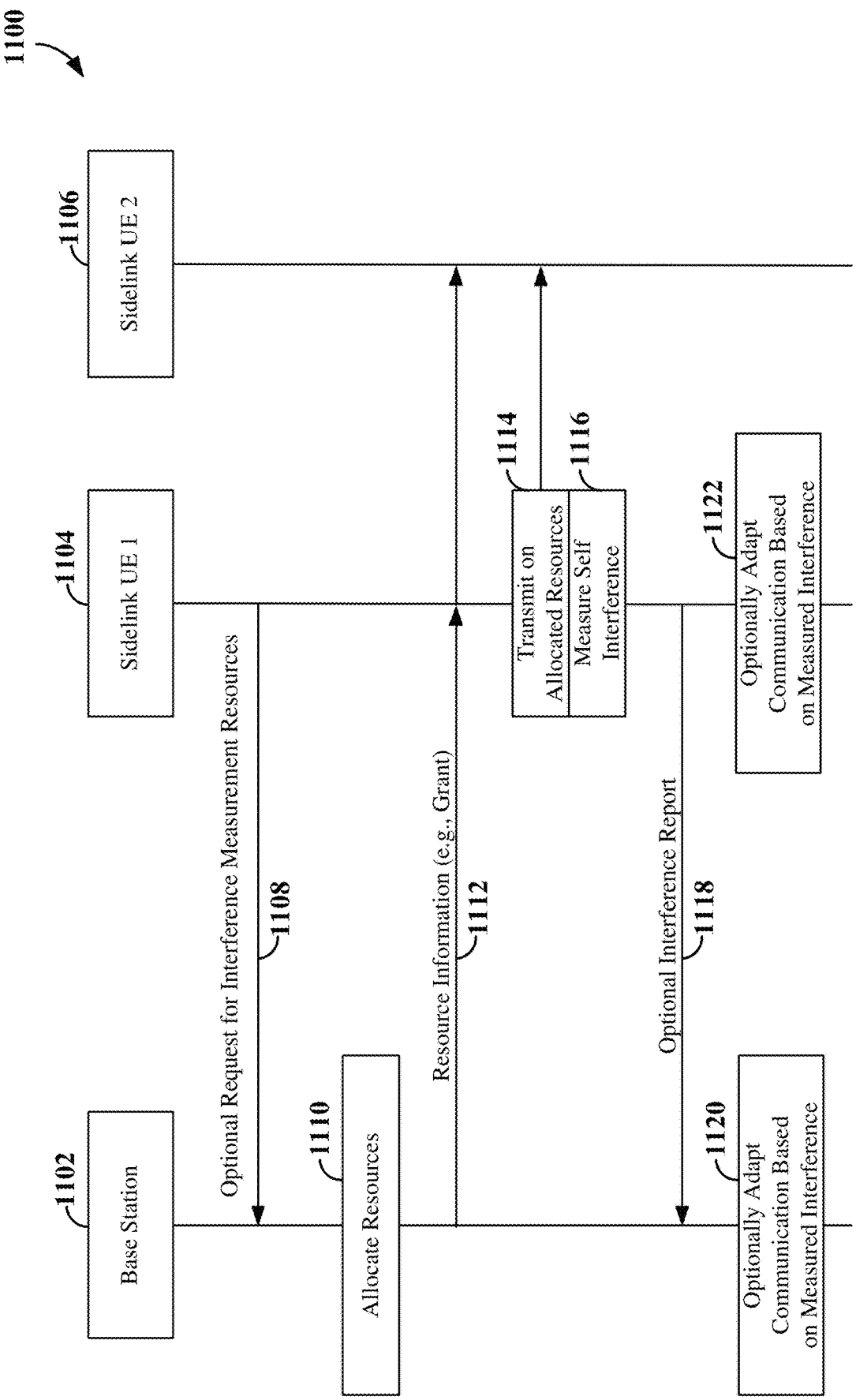
FIG. 11 is a signaling diagram illustrating an example of signaling associated with an interference measurement according to some aspects.

FIG. 11 is a signaling diagram illustrating an example of signaling between a base station (BS) 1102, a UE 1104 (e.g., sidelink device), and a UE 1106 (e.g., sidelink device) that may be used in conjunction with measuring interference. The UEs 1104 and 1106 may correspond to any of the UEs, sidelink devices, D2D devices, V2X devices, or scheduled entities shown in any of FIGS. 1, 3, 4, 12, and 13. The base station 1102 may correspond to any of the base stations or scheduling entities shown in any of FIGS. 1, 3, 4, 12, and 17.

At optional 1108 of FIG. 11, the UE 1104 may send a request to the BS 1102 for an allocation of resources that the UE 1104 may use to conduct an interference measurement. For example, the UE 1104 may transmit a scheduling request (SR) to the BS 1102 that indicates that the UE 1104 has a need for a resource allocation to measure self-interference. In some examples, this request (or some other message) may include a request for a guard band of a certain bandwidth.

At 1110, the BS 1102 may allocate resources (e.g., full-duplex resources, SBFD resources, etc.) for the UE 1104. As discussed above, in some examples, the allocated resources may include resources that the UE 1104 can use for transmission and reception, along with resources (e.g., a guard band) that the UE 1104 can use for an interference measurement. Alternatively, the allocated resources may include resources that the UE 1104 can use for an interference measurement without a data transmission.

As discussed above, in some examples, the BS 1102 may semi-statically allocate resources for interference measurements by the UE 1104. Alternatively or in addition, the BS 1102 may dynamically allocate resources for interference measurements by the UE 1104 in response to a request received at 1108.

At 1112, the BS 1102 may transmit resource allocation information to the UE 1104 that identifies resources that the UE 1104 may use to conduct an interference measurement. In some examples (e.g., when the BS 1102 is scheduling a data transmission for the UE 1104), the resource allocation information may be sent in a grant (e.g., via DCI). In some examples (e.g., when the BS 1102 is not scheduling a data transmission for the UE 1104), the resource allocation information may be sent in a message that dynamically or semi-statically configures measurement resources for the UE 1104.

As indicated in FIG. 11, in some examples, the BS 1112 may transmit the resource allocation information to the UE 1106 so that the UE 1106 is informed that the UE 1104 is conducting interference measurements. In some cases (e.g., when the BS 1102 is scheduling sidelink communication between the UE 1104 and the UE 1104), the resource allocation information may be included in a grant. Alternatively, the UE 1104 may send a sidelink message to UE 1106 to inform the UE 1106 that the UE 1104 is conducting interference measurements.

At 1114, the UE 1104 transmits on an allocated resource (e.g., a transmission resource of a full-duplex allocation, an SBFD allocation, etc.). As mentioned above, in some scenarios, this transmission is a data transmission (e.g., to the UE 1106).

At 1116, the UE 1104 measures interference on an allocated resource (e.g., a guard band of an SBFD allocation) while the UE 1104 is conducting the transmission of 1114.

At optional 1118, the UE 1104 may send an interference report to the BS 1102. This report may, for example, include raw interference measurement data or information that is generated by the UE 1104 based on the raw interference measurement data.

Accordingly, at optional 1120, the BS 1102 may adapt some aspect of its communication based on the interference measured by the UE 1104. For example, the BS 1102 may elect to use a wider guard band for subsequent full-duplex (e.g., SBFD) allocations for the UE 1104 if the measured interference is relatively high. Conversely, the BS 1102 may elect to use a narrower guard band for subsequent full-duplex (e.g., SBFD) allocations for the UE 1104 if the measured interference is relatively low.

Also, at optional 1122, the UE 1104 may adapt some aspect of its communication based on the interference measured by the UE 1104 at 1116. For example, the UE 1104 may elect to request a wider guard band (e.g., at a subsequent 1108) for subsequent full-duplex (e.g., SBFD) allocations for the UE 1104 if the measured interference is relatively high. Conversely, the UE 1104 may elect to request a narrower guard band (e.g., at a subsequent 1108) for subsequent full-duplex (e.g., SBFD) allocations for the UE 1104 if the measured interference is relatively low.

Figure 12:
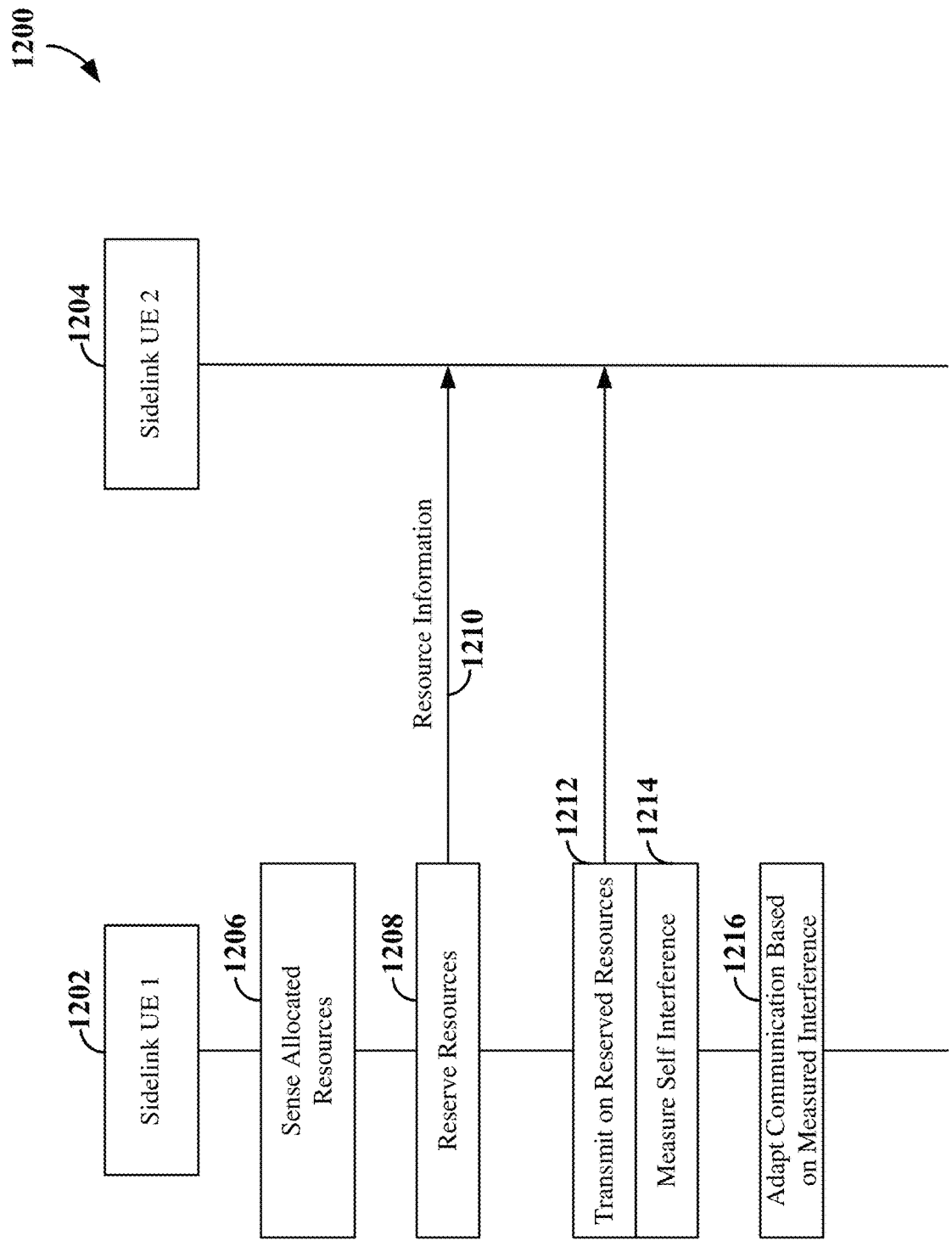
FIG. 12 is a signaling diagram illustrating another example of signaling associated with an interference measurement according to some aspects.

FIG. 12 is a signaling diagram illustrating an example of signaling between a UE 1202 (e.g., sidelink device) and a UE 1104 (e.g., sidelink device) that may be used in conjunction with measuring interference. The UEs 1202 and 1204 may correspond to any of the UEs, sidelink devices, D2D devices, V2X devices, or scheduled entities shown in any of FIGS. 1, 3, 4, 11, and 13.

At 1206 of FIG. 12, the UE 1202 may sense resources (e.g., a sidelink resource pool) that are allocated for the UE 1202 to use for sidelink communication. As discussed above in conjunction with FIG. 9, in some examples, these resource may include a set of resources that a pre-allocated for measurement operations (e.g., an allocated measurement opportunity).

At 1208, the UE 1202 reserves one or more resources that were determined to be available based on the sensing of 1206. For example, the UE 1202 may reserve the resources of a pre-allocated measurement occasion (e.g., as in FIG. 9) or the UE 1202 may reserve some other resources (e.g., as discussed above in conjunction with FIG. 10).

In some examples (e.g., when the UE 1202 has data to transmit to the UE 1204), the UE 1202 may reserve resources (e.g., full-duplex resource, SBFD resources, etc.) for sidelink communication with the UE 1204. In some examples (e.g., when the UE 1202 does not have data to transmit), the UE 1202 may reserve resources simply for the purpose of conducting an interference measurement.

At 1210, the UE 1202 transmits to the UE 1204 information indicative of the resources reserved by the UE 1202 at 1208. For example, the UE 1202 may transmit an indication that the UE 1202 is scheduling a communication with the UE 1204 on a particular set of resources. As another example, the UE 1202 may transmit an indication that the UE 1202 will be conducting an interference measurement on a particular set of resources.

At 1212, the UE 1202 transmits on a reserved resource (e.g., a transmission resource of a full-duplex allocation, an SBFD allocation, etc.). As mentioned above, in some scenarios, this transmission is a data transmission (e.g., to the UE 1204).

At 1214, the UE 1202 measures interference on a reserved resource (e.g., a gap of a pre-configured allocation or a designated subchannel) while the UE 1204 is conducting the transmission of 1212.

At 1216, the UE 1202 may adapt some aspect of its communication based on the interference measured by the UE 1202 at 1214. For example, the UE 1202 may elect to use a wider guard band for subsequent full-duplex (e.g., SBFD) reservations if the measured interference is relatively high. Conversely, the UE 1202 may elect to use a narrower guard band for subsequent full-duplex (e.g., SBFD) reservations if the measured interference is relatively low.

Figure 13:
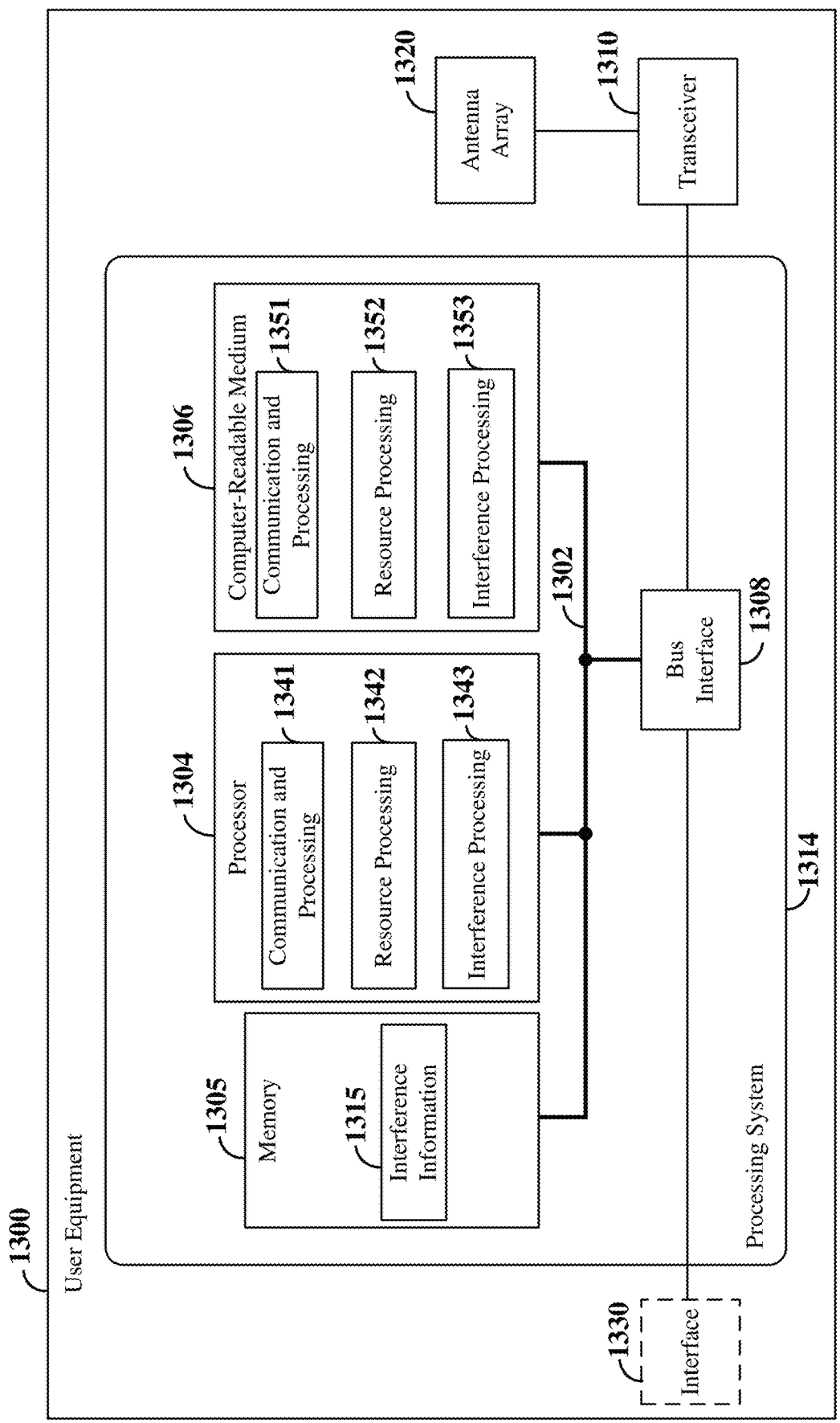
FIG. 13 is a block diagram illustrating an example of a hardware implementation for a user equipment employing a processing system according to some aspects.

FIG. 13 is a conceptual diagram illustrating an example of a hardware implementation for a user equipment 1300 employing a processing system 1314. For example, the user equipment 1300 may be a UE, a sidelink device, a D2D device, a V2X device, or a scheduled entity as illustrated in any of FIGS. 1, 3, 4, 11, and 12.

In accordance with various aspects of the disclosure, an element, or any portion of an element, or any combination of elements may be implemented with the processing system 1314. The processing system 1314 may include one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the user equipment 1300 may be configured to perform any one or more of the functions described herein. That is, the processor 1304, as utilized in a user equipment 1300, may be used to implement any one or more of the methods described herein.

The processor 1304 may in some instances be implemented via a baseband or modem chip and in other implementations, the processor 1304 may itself include a number of devices distinct and different from a baseband or modem chip (e.g., in such scenarios these devices may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and an antenna array 1320 and between the bus 1302 and an interface 1330. The transceiver 1310 provides a means for communicating with various other apparatus over a transmission medium (e.g., air interface). The interface 1330 provides a communication interface or means of communicating with various other apparatuses and devices (e.g., other devices housed within the same apparatus as the user equipment 1300 or other external apparatuses) over an internal bus or external transmission medium. Depending upon the nature of the user equipment 1300, the interface 1330 may include a user interface (e.g., keypad, display, speaker, microphone, joystick). Of course, such a user interface is optional, and may be omitted in some examples, such as an IoT device.

The processor 1304 is responsible for managing the bus 1302 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software. For example, the memory 1305 may store interference information 1315 (e.g., measurement data and allocations for interference measurements) used by the processor 1304 in cooperation with the transceiver 1310 to control interference measurement operations as described herein.

One or more processors 1304 in the processing system may execute software.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. In some examples, the computer-readable medium 1306 may be part of the memory 1305. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1304 may include circuitry configured for various functions. In some aspects, processor 1304 may include circuitry for performing one or more of the operations described herein with respect to FIGS. 6-12 and 14-16.

The processor 1304 may include communication and processing circuitry 1341, configured to communicate with a base station and one or more other wireless communication devices over a common carrier shared between a cellular (e.g., Uu) interface and a sidelink (e.g., PC5) interface. In some examples, the communication and processing circuitry 1341 may include one or more hardware components that provide the physical structure that performs processes related to wireless communication (e.g., signal reception and/or signal transmission) and signal processing (e.g., processing a received signal and/or processing a signal for transmission). The communication and processing circuitry 1341 may further be configured to execute communication and processing software 1351 stored on the computer-readable medium 1306 to implement one or more functions described herein.

In some implementations where the communication involves receiving information, the communication and processing circuitry 1341 may obtain information from a component of the user equipment 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, SCIs, feedback, other information, or any combination thereof. In some examples, the communication and processing circuitry 1341 may receive information via one or more of a PSCCH, a PSSCH, a PSFCH, some other type of channel, or any combination thereof. In some examples, the communication and processing circuitry 1341 may include functionality for a means for receiving (e.g., means for receiving a signal and/or means for receiving control information). In some examples, the communication and processing circuitry 1341 may include functionality for a means for decoding.

In some implementations where the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, SCIs, feedback, other information, or any combination thereof. In some examples, the communication and processing circuitry 1341 may send information via one or more of a PSCCH, a PSSCH, a PSFCH, some other type of channel, or any combination thereof. In some examples, the communication and processing circuitry 1341 may include functionality for a means for sending (e.g., means for transmitting). In some examples, the communication and processing circuitry 1341 may include functionality for a means for encoding.

The processor 1304 may further include resource processing circuitry 1342, configured to perform one or more of the resource processing-related operations described herein (e.g., including those described in conjunction with FIGS. 6-12). In some examples, the resource processing circuitry 1342 may include functionality for a means for receiving scheduling information. For example, the resource processing circuitry 1342 may be configured to receive resource information (e.g., a grant) as described at 1112 of FIG. 11. In some examples, the resource processing circuitry 1342 may include functionality for a means for determining (e.g., selecting) guard band information. For example, the resource processing circuitry 1342 may be configured to determine a guard band size based on interference measured on different frequency resources. In some examples, the resource processing circuitry 1342 may include functionality for a means for transmitting guard band information (e.g., a guard band size). For example, the resource processing circuitry 1342 may be configured to transmit the guard band information to a gNB via a PUCCH, a PUSCH, or a MAC-CE. In some examples, the resource processing circuitry 1342 may include functionality for a means for receiving a request to measure interference. For example, the resource processing circuitry 1342 may be configured to receive a grant on a downlink channel (e.g., via a DCI on a PDCCH) that identifies resources for an interference measurement. In some examples, the resource processing circuitry 1342 may include functionality for a means for transmitting a request for a resource to be used to measure interference. For example, the resource processing circuitry 1342 may be configured to transmit a request as described at 1108 of FIG. 11. In some examples, the resource processing circuitry 1342 may include functionality for a means for identifying resources. For example, the resource processing circuitry 1342 may be configured to identify resources that have been allocated for interference measurements and/or identify resources that may be used for interference measurements. In some examples, the resource processing circuitry 1342 may include functionality for a means sensing signal energy on a resource. For example, the resource processing circuitry 1342 may be configured to sense signal energy on allocated resources as described at 1206 of FIG. 12. In some examples, the resource processing circuitry 1342 may include functionality for a means transmitting an indication to reserve a resource. For example, the resource processing circuitry 1342 may be configured to reserve a resource as described at 1208 and 1210 of FIG. 12. In some examples, the resource processing circuitry 1342 may include functionality for a means selecting a subset of resources for an interference measurement. For example, the resource processing circuitry 1342 may be configured to select resource as described at 1208-1212 of FIG. 12. In some examples, the resource processing circuitry 1342 may include functionality for a means transmitting an indication that a resource is to be used for an interference measurement. For example, the resource processing circuitry 1342 may be configured to transmit resource information as described at 1210 of FIG. 12. In some examples, the resource processing circuitry 1342 may include functionality for a means for receiving an indication of allocated resources. For example, the resource processing circuitry 1342 may be configured to receive resource information as described at 1210 of FIG. 12. The resource processing circuitry 1342 may further be configured to execute resource processing software 1352 stored on the computer-readable medium 1306 to implement one or more functions described herein.

The processor 1304 may further include interference processing circuitry 1343, configured to perform one or more of the interference processing-related operations described herein (e.g., including those described in conjunction with FIGS. 6-12). In some examples, the interference processing circuitry 1343 may include functionality for a means for measuring interference. For example, the interference processing circuitry 1343 may be configured to measure self-interference as described at 1116 of FIG. 11 and/or at 1214 of FIG. 12. In some examples, the interference processing circuitry 1343 may include functionality for a means for generating a report that includes interference measurement information. For example, the interference processing circuitry 1343 may be configured to generate a report as described at 1118 of FIG. 11. In some examples, the interference processing circuitry 1343 may include functionality for a means for transmitting an interference measurement report. For example, the interference processing circuitry 1343 may be configured to transmit a report (e.g., via a PUSCH) as described at 1118 of FIG. 11. In some examples, the interference processing circuitry 1343 may include functionality for a means for transmitting an indication of measured interference. For example, the resource processing circuitry 1342 may be configured to transmit a report (e.g., via a PUSCH) as described at 1118 of FIG. 11. The interference processing circuitry 1343 may further be configured to execute interference processing software 1353 stored on the computer-readable medium 1306 to implement one or more functions described herein.

Figure 14:
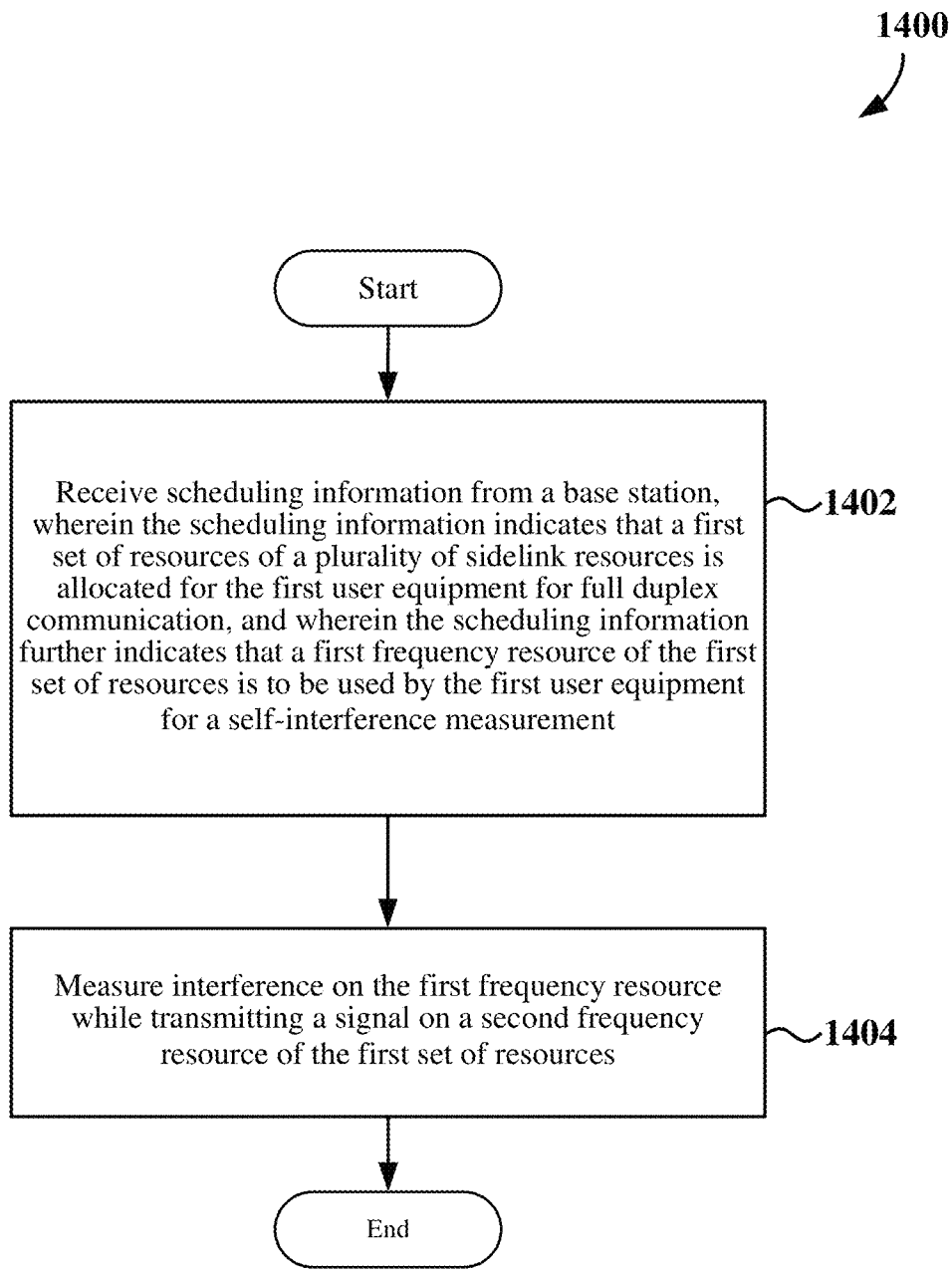
FIG. 14 is a flow chart of an example method for measuring interference according to some aspects.

FIG. 14 is a flow chart of a method 1400 for a user equipment according to some aspects. As described below, some or all illustrated features may be omitted in a particular implementation within the scope of the present disclosure, and some illustrated features may not be required for implementation of all examples. In some examples, the method 1400 may be performed by the user equipment 1300 (e.g., performed by the processing system 1314), as described above and illustrated in FIG. 13, by a processor or processing system, or by any suitable means for carrying out the described functions.

At block 1402, a first user equipment may receive scheduling information from a base station, wherein the scheduling information indicates that a first set of resources of a plurality of sidelink resources is allocated for the first user equipment for full-duplex communication, and wherein the scheduling information further indicates that a first frequency resource of the first set of resources is to be used by the first user equipment for a self-interference measurement. For example, the resource processing circuitry 1342 together with the communication and processing circuitry 1341 and the transceiver 1310, shown and described above in connection with FIG. 13, may provide a means to receive scheduling information from a base station.

In some examples, the first set of resources may include semi-persistent resources to be used for self-interference measurements. In some examples, the first set of resources may include a set of RBs. In some examples, the plurality of sidelink resources may include a sidelink resource pool. In some examples, the first frequency resource may include a guard band. In some examples, the full-duplex communication may include SBFD communication. In some examples, the full-duplex communication may be SBFD communication.

At block 1404, the first user equipment may measure interference on the first frequency resource while transmitting a signal on a second frequency resource of the first set of resources. For example, the interference processing circuitry 1343 together with the communication and processing circuitry 1341 and the transceiver 1310, shown and described above in connection with FIG. 13, may provide a means to measure interference on the first frequency resource while transmitting a signal on a second frequency resource of the first set of resources.

In some examples, the second frequency resource of the first set of resources is allocated for the first user equipment to conduct a data transmission. In some examples, the transmitting the signal on the second frequency resource may include transmitting a protocol data unit to a second user equipment, wherein the protocol data unit does not include data for the second user equipment. In some examples, the method may further include transmitting, e.g., to the second user equipment via a sidelink channel, an indication that the first set of resources is to be used for an interference measurement.

In some examples, the first set of resources may include a first set of symbols of a slot allocated for an interference measurement. In this case, measuring the interference on the first frequency resource may include transmitting a reference signal during the first set of symbols (e.g., via a PUCCH, a PUSCH, or a MAC-CE).

In some examples, the method may further include transmitting an indication of the interference to the base station. In some examples, the method may further include determining guard band information to be used for the self-interference measurement and transmitting the guard band information to the base station (e.g., via a PUCCH, a PUSCH, or a MAC-CE). In some examples, the guard band information may include a guard band size or a plurality of guard band sizes to be used for different transmit power levels.

In some examples, the method may further include receiving at least one indication that includes a request for the first user equipment to measure self-interference. In this case, the measurement of interference on the first frequency resource may be triggered by the at least one indication. In some examples, the scheduling information may be a grant that includes the at least one indication. In some examples, the grant may include at least one of an indication of a resource to be used by the first user equipment to report self-interference, an attribute of a self-interference measurement report, a transmit power level to be used for a self-interference measurement report, a quantity of resources to be monitored for self-interference (e.g., the number of resource for the guard band), or a combination thereof.

In some examples, the method may further include transmitting a request to the base station for a resource to be used for the self-interference measurement. In this case, the scheduling information may be received after (e.g., as a result of) the transmitting of the request.

Figure 15:
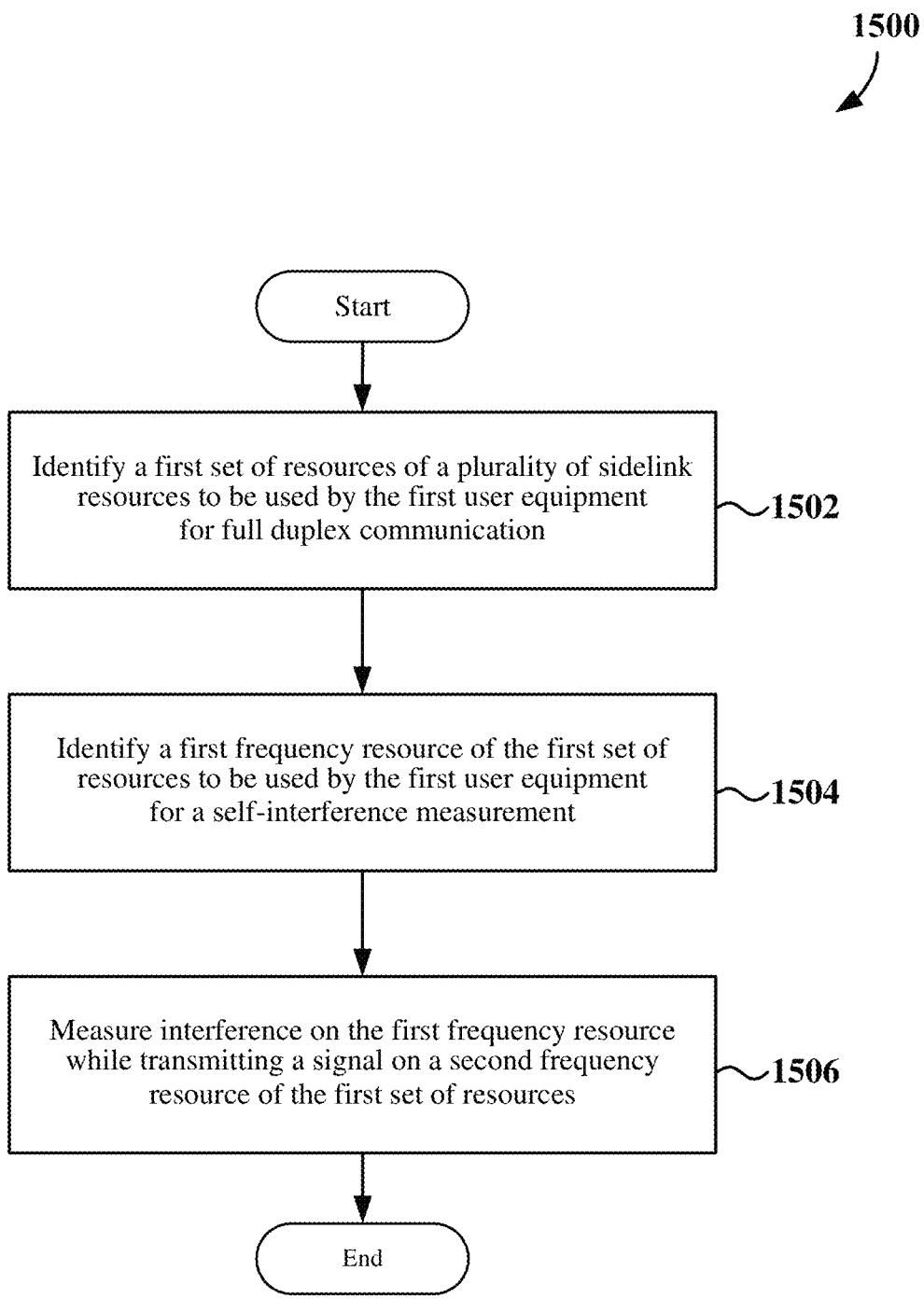
FIG. 15 is a flow chart of another example method for measuring interference according to some aspects.

FIG. 15 is a flow chart of a method 1500 for a user equipment according to some aspects. As described below, some or all illustrated features may be omitted in a particular implementation within the scope of the present disclosure, and some illustrated features may not be required for implementation of all examples. In some examples, the method 1500 may be performed by the user equipment 1300 (e.g., performed by the processing system 1314), as described above and illustrated in FIG. 13, by a processor or processing system, or by any suitable means for carrying out the described functions.

At block 1502, a first user equipment may identify a first set of resources of a plurality of sidelink resources to be used by the first user equipment for full-duplex communication. For example, the resource processing circuitry 1342 together with the communication and processing circuitry 1341 and the transceiver 1310, shown and described above in connection with FIG. 13, may provide a means to identify a first set of resources of a plurality of sidelink resources to be used by the first user equipment for full-duplex communication.

In some examples, the first set of resources may include a set of RBs. In some examples, the plurality of sidelink resources may include a sidelink resource pool. In some examples, the full-duplex communication may include SBFD communication. In some examples, the full-duplex communication may be SBFD communication.

At block 1504, the first user equipment may identify a first frequency resource of the first set of resources to be used by the first user equipment for a self-interference measurement. For example, the resource processing circuitry 1342, shown and described above in connection with FIG. 13, may provide a means to identify a first frequency resource of the first set of resources to be used by the first user equipment for a self-interference measurement.

In some examples, the first frequency resource may include a guard band. In some examples, identifying the first set of resources may include determining that the first set of resources are reserved for measurement of self-interference, and identifying the first frequency resource may include identifying a guard band in the first set of resources. In some examples, the method may further include sensing signal energy on the first set of resources and transmitting an indication on a sidelink channel to reserve the first set of resources after the sensing the signal energy. In some examples, the first set of resources may include a first set of resource blocks and a second set of resource blocks. In some examples, the guard band may include at least one frequency gap between the first set of resource blocks and the second set of resource blocks.

In some examples, the method may further include reserving the first set of resources. In some examples, the identifying the first frequency resource may include selecting a first subset of the first set of resources to be used for the self-interference measurement. In some examples, the method may further include selecting a second subset of the first set of resources to be used for the first user equipment for the transmitting the signal, wherein the second subset is different from the first subset.

In some examples, identifying the first set of resources may include sensing signal energy on the first set of resources and transmitting an indication on a sidelink channel to reserve the first set of resources after sensing the signal energy. In some examples, identifying the first frequency resource may include selecting a subset of the first set of resources to be used for the self-interference measurement.

In some examples, the second frequency resource of the first set of resources is reserved for the first user equipment to conduct a data transmission. In some examples, the transmitting the signal on the second frequency resource may include transmitting a protocol data unit to a second user equipment, wherein the protocol data unit does not include data for the second user equipment. In this case, the method may further include transmitting, e.g., to a second user equipment via a sidelink channel, an indication that the first set of resources is to be used for an interference measurement.

At block 1506, the first user equipment may measure interference on the first frequency resource while transmitting a signal on a second frequency resource of the first set of resources. For example, the interference processing circuitry 1343 together with the communication and processing circuitry 1341 and the transceiver 1310, shown and described above in connection with FIG. 13, may provide a means to measure interference on the first frequency resource while transmitting a signal on a second frequency resource of the first set of resources.

In some examples, the first set of resources may include a first set of symbols of a slot allocated for an interference measurement. In this case, the measuring the interference on the first frequency resource may include transmitting a reference signal during the first set of symbols.

In some examples, the method may further include transmitting, on a sidelink channel, an indication that a first set of subchannels of the first set of resources is reserved for a data transmission and that a second set of subchannels of the first set of resources is reserved for at least one interference measurement. In some examples, the indication specifies resources for a single interference measurement or a plurality of interference measurements. In some examples, the indication specifies a quantity of the second set of subchannels and a location of the second set of subchannels. In some examples, a location of the second set of subchannels is specified by a configuration and the indication specifies a quantity of the second set of subchannels. In some examples, a location of the second set of subchannels and a quantity of the second set of subchannels are specified by a configuration and the indication may include a bit that specifies whether the second set of subchannels are to be used for the at least one interference measurement.

Figure 16:
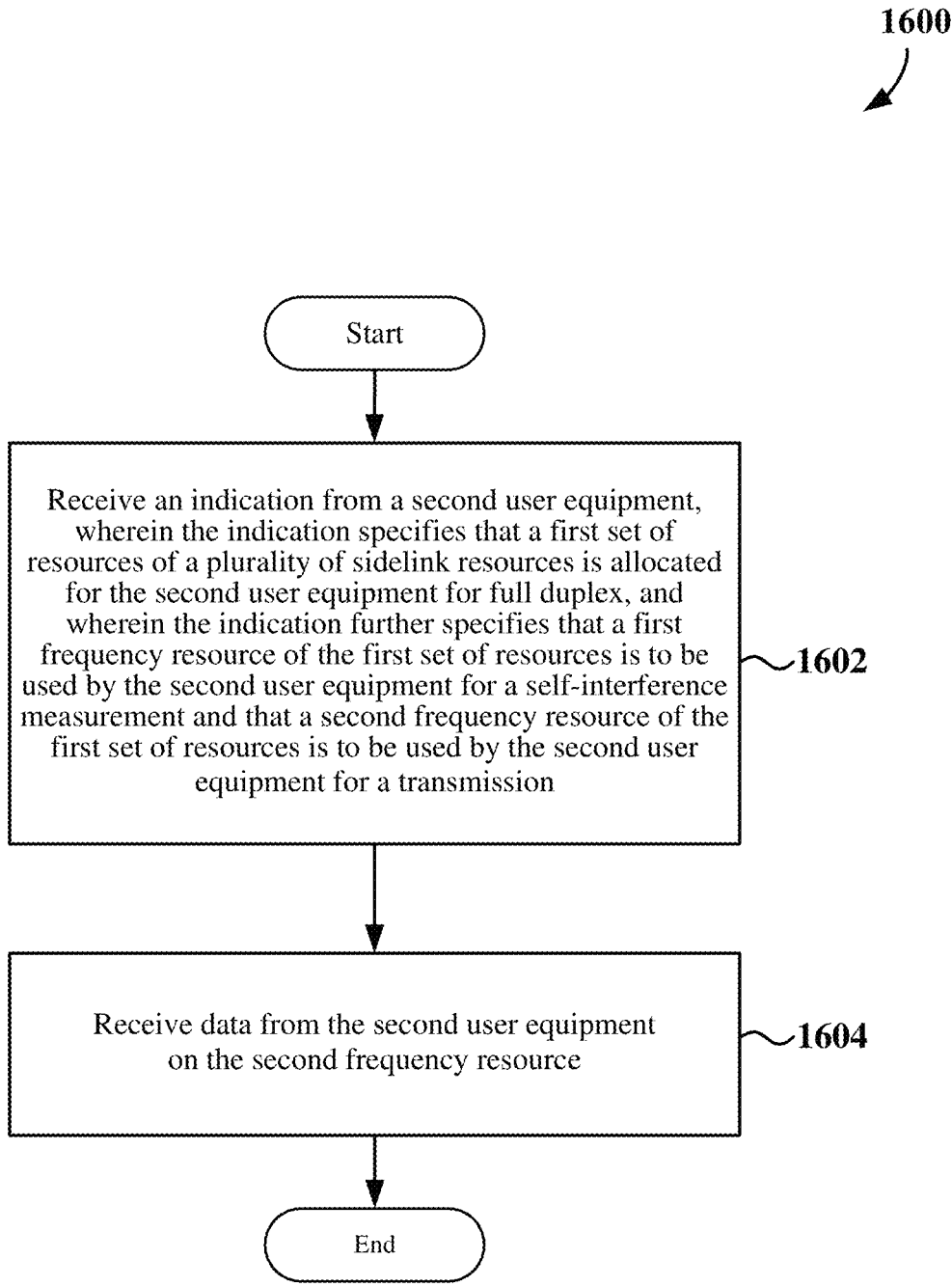
FIG. 16 is a flow chart of an example method for communicating with a user equipment according to some aspects.

FIG. 16 is a flow chart of a method 1600 for a user equipment according to some aspects. As described below, some or all illustrated features may be omitted in a particular implementation within the scope of the present disclosure, and some illustrated features may not be required for implementation of all examples. In some examples, the method 1600 may be performed by the user equipment 1300 (e.g., performed by the processing system 1314), as described above and illustrated in FIG. 13, by a processor or processing system, or by any suitable means for carrying out the described functions.

At block 1602, a first user equipment may receive an indication from a second user equipment, wherein the indication specifies that a first set of resources of a plurality of sidelink resources is allocated for the second user equipment for full-duplex, and wherein the indication further specifies that a first frequency resource of the first set of resources is to be used by the second user equipment for a self-interference measurement and that a second frequency resource of the first set of resources is to be used by the second user equipment for a transmission. For example, the resource processing circuitry 1342 together with the communication and processing circuitry 1341 and the transceiver 1310, shown and described above in connection with FIG. 13, may provide a means to receive an indication from a second user equipment.

In some examples, the full-duplex communication may include SBFD communication. In some examples, the full-duplex communication may be SBFD communication.

In some examples, receiving the indication may include receiving the indication via a sidelink channel. In some examples, the indication specifies resources for a single interference measurement (e.g., a dynamic indication) or a plurality of interference measurements (e.g., a semi-static indication). In some examples, the indication specifies a quantity of subchannels of the first frequency resource and a location of the quantity of subchannels.

In some examples, a location of the first frequency resource is specified by a configuration and the indication specifies a quantity of subchannels of the first frequency resource. In some examples, a location of the first frequency resource and a quantity of subchannels of the first frequency resource are specified by a configuration, and the indication may include a bit that specifies whether the first frequency resource is to be used for the at least one interference measurement.

At block 1604, the first user equipment may receive data from the second user equipment on the second frequency resource. For example, the communication and processing circuitry 1341 and the transceiver 1310, shown and described above in connection with FIG. 13, may provide a means to receive data from the second user equipment on the second frequency resource.

Figure 17:
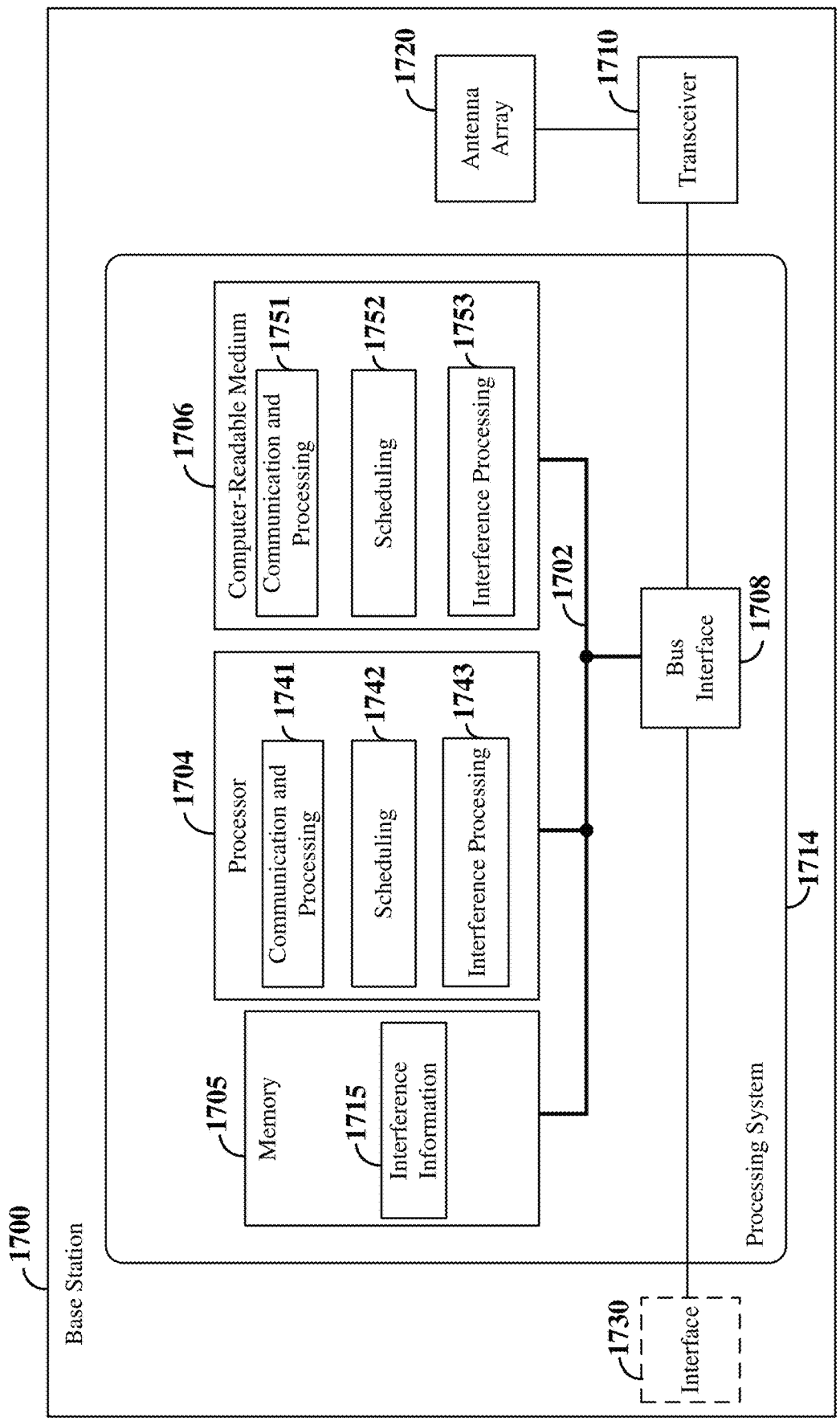
FIG. 17 is a block diagram illustrating an example of a hardware implementation for a base station employing a processing system according to some aspects.

FIG. 17 is a conceptual diagram illustrating an example of a hardware implementation for a base station 1700 employing a processing system 1714. In some implementations, the base station 1700 may correspond to any of the base stations (e.g., gNBs) or scheduling entities as illustrated in any of FIGS. 1, 3, 4, 11, and 12.

In accordance with various aspects of the disclosure, an element, or any portion of an element, or any combination of elements may be implemented with the processing system 1714. The processing system may include one or more processors 1704. The processing system 1714 may be substantially the same as the processing system 1614 illustrated in FIG. 16, including a bus interface 1708, a bus 1702, memory 1705, a processor 1704, a transceiver 1710, an antenna array 1720, and a computer-readable medium 1706. The memory 1705 may store interference information 1715 used by the processor 1704 in cooperation with the transceiver 1710 for measurement operations. Furthermore, the base station 1700 may include an interface 1730 (e.g., a network interface) that provides a means for communicating with at least one other apparatus within a core network and with at least one radio access network.

The base station 1700 may be configured to perform any one or more of the operations described herein (e.g., as described above in conjunction with FIGS. 1-12 and as described below in conjunction with FIG. 18). In some aspects of the disclosure, the processor 1704, as utilized in the base station 1700, may include circuitry configured for various functions.

The processor 1704 may be configured to generate, schedule, and modify a resource assignment or grant of time-frequency resources (e.g., a set of one or more resource elements). For example, the processor 1704 may schedule time-frequency resources within a plurality of time division duplex (TDD) and/or frequency division duplex (FDD) subframes, slots, and/or mini-slots to carry user data traffic and/or control information to and/or from multiple UEs.

The processor 1704 may be configured to schedule resources for the transmission of sidelink signals, downlink signals, or uplink signals. The processor 1704 may be configured to schedule resources for measurement operations.

In some aspects of the disclosure, the processor 1704 may include communication and processing circuitry 1741. The communication and processing circuitry 1744 may be configured to communicate with a UE. The communication and processing circuitry 1741 may include one or more hardware components that provide the physical structure that performs various processes related to communication (e.g., signal reception and/or signal transmission) as described herein. The communication and processing circuitry 1741 may further include one or more hardware components that provide the physical structure that performs various processes related to signal processing (e.g., processing a received signal and/or processing a signal for transmission) as described herein. The communication and processing circuitry 1741 may further be configured to execute communication and processing software 1751 included on the computer-readable medium 1706 to implement one or more functions described herein.

The communication and processing circuitry 1741 may further be configured to receive an indication from the UE. For example, the indication may be included in a MAC-CE carried in a Uu PUSCH or a PSCCH, or included in a Uu RRC message or a sidelink RRC message, or included in a dedicated Uu PUCCH or PUSCH. The communication and processing circuitry 1741 may further be configured to receive a scheduling request from a UE for an uplink grant or a sidelink grant.

In some implementations wherein the communication involves receiving information, the communication and processing circuitry 1741 may obtain information from a component of the base station 1700 (e.g., from the transceiver 1710 that receives the information via radio frequency signaling or some other type of signaling suitable for the applicable communication medium), process (e.g., decode) the information, and output the processed information. For example, the communication and processing circuitry 1741 may output the information to another component of the processor 1704, to the memory 1705, or to the bus interface 1708. In some examples, the communication and processing circuitry 1741 may receive one or more of signals, messages, other information, or any combination thereof. In some examples, the communication and processing circuitry 1741 may receive information via one or more channels. In some examples, the communication and processing circuitry 1741 may include functionality for a means for receiving. In some examples, the communication and processing circuitry 1741 may include functionality for a means for decoding.

In some implementations wherein the communication involves sending (e.g., transmitting) information, the communication and processing circuitry 1741 may obtain information (e.g., from another component of the processor 1704, the memory 1705, or the bus interface 1708), process (e.g., encode) the information, and output the processed information. For example, the communication and processing circuitry 1741 may output the information to the transceiver 1710 (e.g., that transmits the information via radio frequency signaling or some other type of signaling suitable for the applicable communication medium). In some examples, the communication and processing circuitry 1741 may send one or more of signals, messages, other information, or any combination thereof. In some examples, the communication and processing circuitry 1741 may send information via one or more channels. In some examples, the communication and processing circuitry 1741 may include functionality for a means for sending (e.g., a means for transmitting). In some examples, the communication and processing circuitry 1741 may include functionality for a means for encoding.

The processor 1704 may further include scheduling circuitry 1742, configured to perform one or more of the scheduling-related operations described herein (e.g., including those described in conjunction with FIGS. 6-12). In some examples, the scheduling circuitry 1742 may include functionality for a means for allocating resources. For example, the scheduling circuitry 1742 may be configured to allocate resources as described at 1110 of FIG. 11. In some examples, the scheduling circuitry 1742 may include functionality for a means for generating scheduling information. For example, the scheduling circuitry 1742 may be configured to determine that a wireless communication device is able to support a measurement operation and then schedule resources for the measurement operation. In some examples, the scheduling circuitry 1742 may include functionality for a means for transmitting scheduling information. For example, the scheduling circuitry 1742 may be configured to transmit resource information (e.g., a grant) as described at 1112 of FIG. 11. In some examples, the scheduling circuitry 1742 may include functionality for a means for abstaining from scheduling transmissions for at least one second UE on a frequency resource (e.g., a guard band). For example, the scheduling circuitry 1742 may be configured to schedule a second UE on a resource other than a first resource during a slot in which the first resource is being used by a first UE for a self-interference measurement. In some examples, the scheduling circuitry 1742 may include functionality for a means for identifying the at least one second UE. For example, the scheduling circuitry 1742 may be configured to determine (e.g., based on signal measurements) that transmissions by a second UE may interfere with reception at a first UE. In some examples, the scheduling circuitry 1742 may include functionality for a means for scheduling a transmission. For example, the scheduling circuitry 1742 may be configured to generate a grant that schedules an FD communication for a UE. In some examples, the scheduling circuitry 1742 may include functionality for a means for scheduling an SBFD communication. For example, the scheduling circuitry 1742 may be configured to generate a grant that schedules an SBFD communication for a UE. In some examples, the scheduling circuitry 1742 may include functionality for a means for receiving guard band information. For example, the scheduling circuitry 1742 may be configured to receive a PUCCH, a PUSCH, a MAC-CE, or some other type of signaling from a UE that indicates one or more requested guard band parameters. In some examples, the scheduling circuitry 1742 may include functionality for a means for transmitting a request for a UE to measure interference. For example, the scheduling circuitry 1742 may be configured to generate a grant that identifies resources for an interference measurement and transmit the grant on a downlink channel (e.g., via a DCI on a PDCCH). In some examples, the scheduling circuitry 1742 may include functionality for a means for receiving a request for resources to be used to measure interference. For example, the scheduling circuitry 1742 may be configured to receive a request as described at 1108 of FIG. 11. In some examples, the scheduling circuitry 1742 may include functionality for a means for transmitting an indication that a resource is to be used for an interference measurement. For example, the scheduling circuitry 1742 may be configured to generate a grant that identifies resources for an interference measurement and transmit the grant on a downlink channel (e.g., via a DCI on a PDCCH). The scheduling circuitry 1742 may further be configured to execute scheduling software 1752 stored on the computer-readable medium 1706 to implement one or more functions described herein.

The processor 1704 may further include interference processing circuitry 1743, configured to perform one or more of the interference processing-related operations described herein (e.g., including those described in conjunction with FIGS. 6-12). In some examples, the interference processing circuitry 1743 may include functionality for a means for receiving interference information from a user equipment. For example, the interference processing circuitry 1743 may be configured to receive a report as described at 1118 of FIG. 11 and process the report as described at 1120 of FIG. 11. The interference processing circuitry 1743 may further be configured to execute interference processing software 1753 stored on the computer-readable medium 1706 to implement one or more functions described herein.

Figure 18:
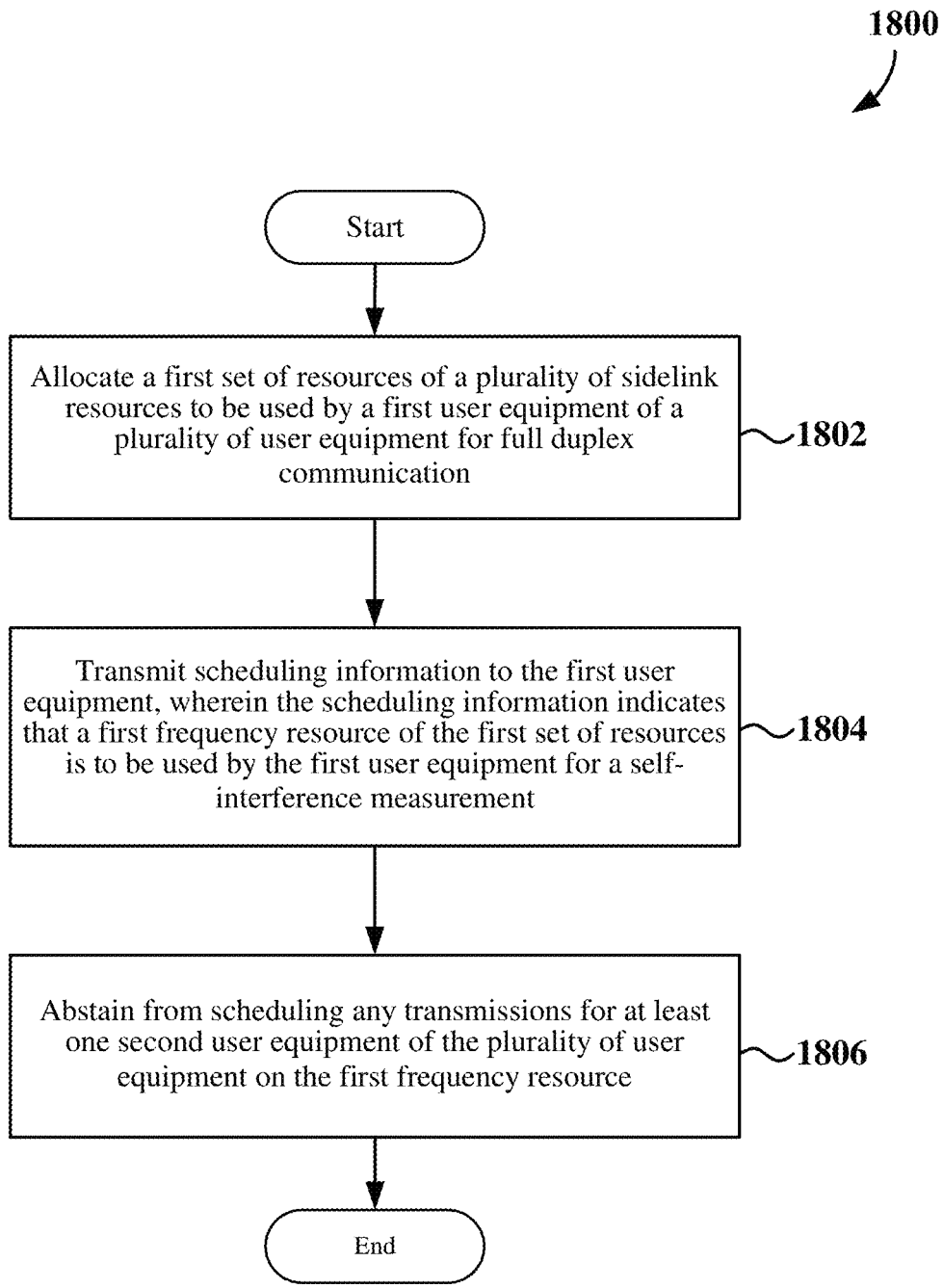
FIG. 18 is a flow chart of an example method for scheduling resources for an interference measurement according to some aspects.

FIG. 18 is a flow chart of a method 1800 for a base station according to some aspects. As described below, some or all illustrated features may be omitted in a particular implementation within the scope of the present disclosure, and some illustrated features may not be required for implementation of all examples. In some examples, the method 1800 may be performed by the base station 1700 (e.g., performed by the processing system 1714), as described above and illustrated in FIG. 17, by a processor or processing system, or by any suitable means for carrying out the described functions.

At block 1802, a base station may allocate a first set of resources of a plurality of sidelink resources to be used by a first user equipment of a plurality of user equipment for full-duplex communication. For example, the scheduling circuitry 1742 together with the communication and processing circuitry 1741 and the transceiver 1710, shown and described above in connection with FIG. 17, may provide a means to allocate a first set of resources of a plurality of sidelink resources to be used by a first user equipment of a plurality of user equipment for full-duplex communication.

In some examples, the full-duplex communication may include SBFD communication. In some examples, the full-duplex communication may be SBFD communication.

In some examples, allocating the first set of resources may include allocating semi-persistent resources to be used for self-interference measurements. In some examples, allocating the first set of resources may include allocating a second resource of the first set of resources to be used by the first user equipment for a data transmission. In some examples, allocating the first set of resources may include allocating the first set of resources for a non-data (e.g., empty protocol data unit) transmission by the first user equipment, and transmitting, to the plurality of user equipment, an indication that the first set of resources is to be used for an interference measurement. In some examples, allocating the first set of resources may include allocating a first set of symbols of a slot for an interference measurement, and allocating a second set of symbols of the slot for a data transmission.

At block 1804, the base station may transmit scheduling information to the first user equipment, wherein the scheduling information indicates that a first frequency resource of the first set of resources is to be used by the first user equipment for a self-interference measurement. For example, the scheduling circuitry 1742 together with the communication and processing circuitry 1741 and the transceiver 1710, shown and described above in connection with FIG. 17, may provide a means to transmit scheduling information to the first user equipment.

At block 1806, the base station may abstain from scheduling any transmissions for at least one second user equipment of the plurality of user equipment on the first frequency resource. For example, the scheduling circuitry 1742, shown and described above in connection with FIG. 17, may provide a means to abstain from scheduling any transmissions for at least one second user equipment of the plurality of user equipment on the first frequency resource.

In some examples, the method may further include identifying the at least one second user equipment based on at least one distance between the first user equipment and the at least one second user equipment, at least one zone associated with the first user equipment and the at least one second user equipment, or at least one identifier received from the first user equipment.

In some examples, the method may further include scheduling at least one transmission for at least one third user equipment of the plurality of user equipment on the first frequency resource after determining that the at least one third user equipment is at least a threshold distance away from the first user equipment or after determining that the first user equipment and the at least one third user equipment are in different zones.

In some examples, the method may further include receiving self-interference information from the first user equipment and scheduling another full-duplex communication (e.g., another SBFD communication) by the first user equipment based on the self-interference information.

In some examples, the method may further include receiving guard band information from the first user equipment (e.g., via a PUCCH, a PUSCH, or a MAC-CE) and scheduling another full-duplex communication (e.g., another SBFD communication) by the first user equipment based on the guard band information. In some examples, the guard band information may include a guard band size in terms of subchannels or RBs and/or guard band sizes for different Tx power levels, etc.

In some examples, the method may further include transmitting at least one indication that includes a request for the first user equipment to measure self-interference. In some examples, the scheduling information may include a grant that includes the at least one indication. In some examples, the grant may include at least one of an indication of a resource to be used by the first user equipment to report self-interference, an attribute of a self-interference measurement report, a transmit power level to be used for a self-interference measurement report, a quantity of resources to be monitored for self-interference, or a combination thereof. In some examples, transmitting the at least one indication may include transmitting the at least one indication to the first user equipment or transmitting at the least one indication to the plurality of user equipment.

In some examples, the method may further include receiving a request from the first user equipment for a resource to be used by the first user equipment to measure self-interference, wherein the scheduling information is transmitted in response to the request.

The methods shown in FIGS. 14-16 and 18 may include additional aspects, such as any single aspect or any combination of aspects described below and/or in connection with one or more other processes described elsewhere herein. The following provides an overview of several aspects of the present disclosure.

In some examples, a method for wireless communication at a first user equipment is disclosed. The method may include receiving an indication from a second user equipment, wherein the indication specifies that a first set of resources of a plurality of sidelink resources is allocated for the second user equipment for full-duplex, and wherein the indication further specifies that a first frequency resource of the first set of resources is to be used by the second user equipment for a self-interference measurement and that a second frequency resource of the first set of resources is to be used by the second user equipment for a transmission, and receiving data from the second user equipment on the second frequency resource.

In some examples, a first user equipment may include a transceiver, a memory, and a processor coupled to the transceiver and the memory. The processor and the memory may be configured to receive an indication from a second user equipment via the transceiver, wherein the indication specifies that a first set of resources of a plurality of sidelink resources is allocated for the second user equipment for full-duplex, and wherein the indication further specifies that a first frequency resource of the first set of resources is to be used by the second user equipment for a self-interference measurement and that a second frequency resource of the first set of resources is to be used by the second user equipment for a transmission, and receive data from the second user equipment on the second frequency resource via the transceiver.

In some examples, a first user equipment may include means for receiving an indication from a second user equipment, wherein the indication specifies that a first set of resources of a plurality of sidelink resources is allocated for the second user equipment for full-duplex, and wherein the indication further specifies that a first frequency resource of the first set of resources is to be used by the second user equipment for a self-interference measurement and that a second frequency resource of the first set of resources is to be used by the second user equipment for a transmission, and means for receiving data from the second user equipment on the second frequency resource.

In some examples, an article of manufacture for use by a first user equipment includes a non-transitory computer-readable medium having stored therein instructions executable by one or more processors of the first user equipment to receive an indication from a second user equipment, wherein the indication specifies that a first set of resources of a plurality of sidelink resources is allocated for the second user equipment for full-duplex, and wherein the indication further specifies that a first frequency resource of the first set of resources is to be used by the second user equipment for a self-interference measurement and that a second frequency resource of the first set of resources is to be used by the second user equipment for a transmission, and receive data from the second user equipment on the second frequency resource.

In some examples, a method for wireless communication at a base station is disclosed. The method may include allocating a first set of resources of a plurality of sidelink resources to be used by a first user equipment of a plurality of user equipment for full-duplex communication, transmitting scheduling information to the first user equipment, wherein the scheduling information indicates that a first frequency resource of the first set of resources is to be used by the first user equipment for a self-interference measurement, and abstaining from scheduling any transmissions for at least one second user equipment of the plurality of user equipment on the first frequency resource.

In some examples, a base station may include a transceiver, a memory, and a processor coupled to the transceiver and the memory. The processor and the memory may be configured to allocate a first set of resources of a plurality of sidelink resources to be used by a first user equipment of a plurality of user equipment for full-duplex communication, transmit scheduling information to the first user equipment via the transceiver, wherein the scheduling information indicates that a first frequency resource of the first set of resources is to be used by the first user equipment for a self-interference measurement, and abstain from scheduling any transmissions for at least one second user equipment of the plurality of user equipment on the first frequency resource.

In some examples, a base station may include means for allocating a first set of resources of a plurality of sidelink resources to be used by a first user equipment of a plurality of user equipment for full-duplex communication, means for transmitting scheduling information to the first user equipment, wherein the scheduling information indicates that a first frequency resource of the first set of resources is to be used by the first user equipment for a self-interference measurement, and means for abstaining from scheduling any transmissions for at least one second user equipment of the plurality of user equipment on the first frequency resource.

In some examples, an article of manufacture for use by a base station includes a non-transitory computer-readable medium having stored therein instructions executable by one or more processors of the base station to allocate a first set of resources of a plurality of sidelink resources to be used by a first user equipment of a plurality of user equipment for full-duplex communication, transmit scheduling information to the first user equipment, wherein the scheduling information indicates that a first frequency resource of the first set of resources is to be used by the first user equipment for a self-interference measurement, and abstain from scheduling any transmissions for at least one second user equipment of the plurality of user equipment on the first frequency resource.

Aspect 1: A method for wireless communication at a first user equipment, the method comprising: receiving scheduling information from a base station, wherein the scheduling information indicates that a first set of resources of a plurality of sidelink resources is allocated for the first user equipment for full-duplex communication, and wherein the scheduling information further indicates that a first frequency resource of the first set of resources is to be used by the first user equipment for a self-interference measurement; and measuring interference on the first frequency resource while transmitting a signal on a second frequency resource of the first set of resources.

Aspect 2: The method of aspect 1, further comprising: transmitting an indication of the interference to the base station.

Aspect 3: The method of aspect 1 or 2, further comprising: determining guard band information to be used for the self-interference measurement; and transmitting the guard band information to the base station.

Aspect 4: The method of aspect 3, wherein the guard band information comprises:
a guard band size; or a plurality of guard band sizes to be used for different transmit power levels.

Aspect 5: The method of any of aspects 1 through 4, further comprising: receiving at least one indication comprising a request for the first user equipment to measure self-interference, wherein the measuring interference on the first frequency resource is triggered by the at least one indication.

Aspect 6: The method of aspect 5, wherein the scheduling information comprises a grant that includes the at least one indication.

Aspect 7: The method of aspect 6, wherein the grant comprises at least one of: an indication of a resource to be used by the first user equipment to report self-interference, an attribute of a self-interference measurement report, a transmit power level to be used for a self-interference measurement report, a quantity of resources to be monitored for self-interference, or a combination thereof.

Aspect 8: The method of any of aspects 1 through 7, wherein the first set of resources comprises semi-persistent resources to be used for self-interference measurements.

Aspect 9: The method of any of aspects 1 through 8, further comprising:
transmitting a request to the base station for a resource to be used for the self-interference measurement, wherein the scheduling information is received as a result of the transmitting to the request.

Aspect 10: The method of any of aspects 1 through 9, wherein the second frequency resource of the first set of resources is allocated for the first user equipment to conduct a data transmission.

Aspect 11: The method of any of aspects 1 through 9, wherein: the transmitting the signal on the second frequency resource comprises transmitting a protocol data unit to a second user equipment; the protocol data unit does not include data for the second user equipment; and the method further comprises transmitting, to the second user equipment via a sidelink channel, an indication that the first set of resources is to be used for an interference measurement.

Aspect 12: The method of any of aspects 1 through 11, wherein: the first set of resources comprises a first set of symbols of a slot allocated for an interference measurement; and the measuring the interference on the first frequency resource comprises transmitting a reference signal during the first set of symbols.

Aspect 16: A method for wireless communication at a first user equipment, the method comprising: identifying a first set of resources of a plurality of sidelink resources to be used by the first user equipment for full-duplex communication; identifying a first frequency resource of the first set of resources to be used by the first user equipment for a self-interference measurement; and measuring interference on the first frequency resource while transmitting a signal on a second frequency resource of the first set of resources.

Aspect 17: The method of aspect 16, wherein: the identifying the first set of resources comprises determining that the first set of resources are reserved for measurement of self-interference; and the identifying the first frequency resource comprises identifying a guard band in the first set of resources.

Aspect 18: The method of aspect 17, further comprising: sensing signal energy on the first set of resources; and transmitting an indication on a sidelink channel to reserve the first set of resources after the sensing the signal energy.

Aspect 19: The method of any of aspects 17 through 18, wherein: the first set of resources comprises a first set of resource blocks and a second set of resource blocks; and the guard band comprises at least one frequency gap between the first set of resource blocks and the second set of resource blocks.

Aspect 20: The method of any of aspects 16 through 19, further comprising:
reserving the first set of resources, wherein the identifying the first frequency resource comprises selecting a first subset of the first set of resources to be used for the self-interference measurement.

Aspect 21: The method of aspect 20, further comprising: selecting a second subset of the first set of resources to be used for the first user equipment for the transmitting the signal, wherein the second subset is different from the first subset.

Aspect 22: The method of any of aspects 16 through 21, wherein the second frequency resource of the first set of resources is reserved for the first user equipment to conduct a data transmission.

Aspect 23: The method of any of aspects 16 through 21, wherein: the transmitting the signal on the second frequency resource comprises transmitting a protocol data unit to a second user equipment; the protocol data unit does not include data for the second user equipment; and the method further comprises transmitting, to the second user equipment via a sidelink channel, an indication that the first set of resources is to be used for an interference measurement.

Aspect 24: The method of any of aspects 16 through 23, wherein: the first set of resources comprises a first set of symbols of a slot allocated for an interference measurement; and the measuring the interference on the first frequency resource comprises transmitting a reference signal during the first set of symbols.

Aspect 25: The method of any of aspects 16 through 24, further comprising:
transmitting, on a sidelink channel, an indication that a first set of subchannels of the first set of resources is reserved for a data transmission and that a second set of subchannels of the first set of resources is reserved for at least one interference measurement.

Aspect 26: The method of aspect 25, wherein the indication specifies resources for a single interference measurement or a plurality of interference measurements.

Aspect 27: The method of aspect 25, wherein the indication specifies a quantity of the second set of subchannels and a location of the second set of subchannels.

Aspect 28: The method of aspect 25, wherein: a location of the second set of subchannels is specified by a configuration; and the indication specifies a quantity of the second set of subchannels.

Aspect 29: The method of aspect 25, wherein: a location of the second set of subchannels and a quantity of the second set of subchannels are specified by a configuration; and the indication comprises a bit that specifies whether the second set of subchannels are to be used for the at least one interference measurement.

Aspect 30: A first user equipment comprising: a transceiver configured to communicate with a radio access network, a memory, and a processor communicatively coupled to the transceiver and the memory, wherein the processor and the memory are configured to perform any one of aspects 1 through 12.

Aspect 31: An apparatus configured for wireless communication comprising at least one means for performing any one of aspects 1 through 12.

Aspect 32: A non-transitory computer-readable medium storing computer-executable code, comprising code for causing an apparatus to perform any one of aspects 1 through 12.

Aspect 33: A first user equipment comprising: a transceiver, a memory, and a processor communicatively coupled to the transceiver and the memory, wherein the processor and the memory are configured to perform any one of aspects 16 through 29.

Aspect 34: An apparatus configured for wireless communication comprising at least one means for performing any one of aspects 16 through 29.

Aspect 35: A non-transitory computer-readable medium storing computer-executable code, comprising code for causing an apparatus to perform any one of aspects 16 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 4, 11, 12, 13, and 17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a first user equipment, the method comprising:
    transmitting a request for resources for a self-interference measurement to a base station, the request comprising guard band information for the self-interference measurement;
    receiving scheduling information from the base station, wherein the scheduling information indicates that a first set of resources of a plurality of sidelink resources is allocated for the first user equipment for full-duplex communication, and wherein the scheduling information further indicates that a guard band based on the guard band information is to be used by the first user equipment for the self-interference measurement;
    measuring self-interference on the guard band while transmitting a signal on a first frequency resource of the first set of resources; and
    transmitting an indication of the self-interference to the base station.

2. The method of claim 1, further comprising:
    determining the guard band information to be used for the self-interference measurement.

3. The method of claim 2, wherein the guard band information comprises:
    a guard band size; or
    a plurality of guard band sizes to be used for different transmit power levels.

4. The method of claim 1, further comprising:
    receiving at least one indication comprising a request for the first user equipment to measure the self-interference,
    wherein the measuring the self-interference on the guard band is triggered by the at least one indication.

5. The method of claim 4, wherein the scheduling information comprises a grant that includes the at least one indication.

6. The method of claim 5, wherein the grant comprises at least one of:
    an indication of a resource to be used by the first user equipment to report the self-interference,
    an attribute of a self-interference measurement report,
    a transmit power level to be used for the self-interference measurement report,
    a quantity of resources to be monitored for the self-interference,
    or a combination thereof.

7. The method of claim 1, wherein the first set of resources comprises semi-persistent resources to be used for the self-interference measurement.

8. The method of claim 1,
    wherein the scheduling information is received as a result of the transmitting of the request.

9. The method of claim 1, wherein the first frequency resource of the first set of resources is allocated for the first user equipment to conduct a data transmission.

10. The method of claim 1, wherein:
the transmitting the signal on the first frequency resource comprises transmitting a protocol data unit to a second user equipment;
the protocol data unit does not include data for the second user equipment; and
the method further comprises transmitting, to the second user equipment via a sidelink channel, an indication that the first set of resources is to be used for the self-interference measurement.

11. The method of claim 1, wherein:
the first set of resources comprises a first set of symbols of a slot allocated for the self-interference measurement; and
the measuring the self-interference on the guard band comprises transmitting a reference signal during the first set of symbols.

12. A first user equipment, comprising:
a transceiver;
a memory; and
at least one processor communicatively coupled to the transceiver and the memory, wherein the at least one processor is individually or collectively configured to:
transmit a request for resources for a self-interference measurement to a base station, the request comprising guard band information for the self-interference measurement;
receive scheduling information from the base station, wherein the scheduling information indicates that a first set of resources of a plurality of sidelink resources is allocated for the first user equipment for full-duplex communication, and wherein the scheduling information further indicates that a guard band based on the guard band information is to be used by the first user equipment for the self-interference measurement;
measure self-interference on the guard band while a signal is transmitted on a first frequency resource of the first set of resources via the transceiver; and
transmit an indication of the self-interference to the base station.

13. The first user equipment of claim 12, wherein the at least one processor is further individually or collectively configured to:
determine the guard band information to be used for the self-interference measurement.

14. A method for wireless communication at a first user equipment, the method comprising:
identifying a first set of resources of a plurality of sidelink resources to be used by the first user equipment for full-duplex communication;
identifying a guard band of the first set of resources to be used by the first user equipment for a self-interference measurement;
transmitting, to a second user equipment, an indication that the first user equipment is reserving the guard band for the self-interference measurement and a first frequency resource of the first set of resources for a transmission; and
measuring self-interference on the guard band while transmitting a signal on the first frequency resource of the first set of resources.

15. The method of claim 14, wherein:
the identifying the first set of resources comprises determining that the first set of resources are reserved for the self-interference measurement.

16. The method of claim 15, further comprising:
sensing signal energy on the first set of resources; and
transmitting the indication on a sidelink channel to reserve the first set of resources after the sensing the signal energy.

17. The method of claim 15, wherein:
the first set of resources comprises a first set of resource blocks and a second set of resource blocks; and
the guard band comprises at least one frequency gap between the first set of resource blocks and the second set of resource blocks.

18. The method of claim 14, further comprising:
reserving the first set of resources,
wherein the identifying the guard band comprises selecting a first subset of the first set of resources to be used for the self-interference measurement.

19. The method of claim 18, further comprising:
selecting a second subset of the first set of resources to be used for the first user equipment for the transmitting the signal, wherein the second subset is different from the first subset.

20. The method of claim 14, wherein:
the transmitting the signal on the first frequency resource comprises transmitting a protocol data unit to the second user equipment; and
the protocol data unit does not include data for the second user equipment.

21. The method of claim 14, wherein:
the first set of resources comprises a first set of symbols of a slot allocated for the self-interference measurement; and
the measuring the self-interference on the guard band comprises transmitting a reference signal during the first set of symbols.

22. The method of claim 14,
wherein the indication indicates that a first set of subchannels of the first set of resources is reserved for a data transmission and that a second set of subchannels of the first set of resources is reserved for at least one interference measurement.

23. The method of claim 22, wherein the indication specifies resources for a single interference measurement or a plurality of interference measurements.

24. The method of claim 22, wherein the indication specifies a quantity of the second set of subchannels and a location of the second set of subchannels.

25. The method of claim 22, wherein:
a location of the second set of subchannels is specified by a configuration; and
the indication specifies a quantity of the second set of subchannels.

26. The method of claim 22, wherein:
a location of the second set of subchannels and a quantity of the second set of subchannels are specified by a configuration; and
the indication comprises a bit that specifies whether the second set of subchannels are to be used for the at least one interference measurement.

27. A first user equipment, comprising:
a transceiver;
a memory; and
at least one processor communicatively coupled to the transceiver and the memory, wherein the at least one processor is individually or collectively configured to:
identify a first set of resources of a plurality of sidelink resources to be used by the first user equipment for sub-band full-duplex communication;

identify a guard band of the first set of resources to be used by the first user equipment for a self-interference measurement;
transmit, to a second user equipment, an indication of a reservation by the first user equipment of the guard band for the self-interference measurement and a first frequency resource of the first set of resources for a transmission; and; and
measure self-interference on the guard band while transmitting a signal on the first frequency resource of the first set of resources via the transceiver.

\* \* \* \* \*